(12) United States Patent
Yoon

(10) Patent No.: US 11,825,447 B2
(45) Date of Patent: *Nov. 21, 2023

(54) APPARATUS AND METHOD FOR TRANSMITTING DATA THROUGH DEVICE TO DEVICE COMMUNICATION

(71) Applicant: Innovative Technology Lab Co., Ltd., Seoul (KR)

(72) Inventor: Sung Joon Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 314 days.

This patent is subject to a terminal disclaimer.

(21) Appl. No.: 17/192,755

(22) Filed: Mar. 4, 2021

(65) Prior Publication Data

US 2021/0195561 A1 Jun. 24, 2021

Related U.S. Application Data

(63) Continuation of application No. 16/874,021, filed on May 14, 2020, now Pat. No. 10,973,004, which is a (Continued)

(30) Foreign Application Priority Data

May 9, 2014 (KR) .................. 10-2014-0055359

(51) Int. Cl.
*H04W 72/02* (2009.01)
*H04W 28/02* (2009.01)
(Continued)

(52) U.S. Cl.
CPC .......... *H04W 72/02* (2013.01); *H04L 5/0032* (2013.01); *H04L 5/0037* (2013.01);
(Continued)

(58) Field of Classification Search
CPC ....... H04W 4/70; H04W 76/14; H04W 72/02; H04W 4/80; H04W 8/005;
(Continued)

(56) References Cited

U.S. PATENT DOCUMENTS

2013/0059583 A1 3/2013 Van Phan et al.
2013/0142268 A1 6/2013 Gao et al.
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.1.0, Mar. 2014, pp. 1-186, 3GPP Organizational Partners.

(Continued)

*Primary Examiner* — Rhonda L Murphy

(57) ABSTRACT

Exemplary embodiments provide a method and apparatus for transmitting data through a device-to-device (D2D) communication between user equipments (UEs), the method including: generating, at a first UE, first D2D data, the first D2D data corresponding to a transport block (TB) unit; and transmitting, from the first UE to a second UE, the first D2D data through at least one D2D communication resource, the at least one D2D communication resource being based on a sub-RPT (sub-resource pattern for transmission). An RPT defined in a D2D resource pool is configured based on the sub-RPT, and the sub-RPT indicates the at least one D2D communication resource for the transmission of the first D2D data among at least two D2D communication candidate resources.

18 Claims, 15 Drawing Sheets

Related U.S. Application Data continuation of application No. 16/111,103, filed on Aug. 23, 2018, now Pat. No. 10,681,675, which is a continuation of application No. 14/708,013, filed on May 8, 2015, now Pat. No. 10,085,236.

(51) Int. Cl.
| | |
|---|---|
| *H04L 5/00* | (2006.01) |
| *H04W 4/70* | (2018.01) |
| *H04W 4/80* | (2018.01) |
| *H04W 76/14* | (2018.01) |
| *H04W 8/00* | (2009.01) |
| *H04W 92/18* | (2009.01) |
| *H04W 72/0446* | (2023.01) |

(52) U.S. Cl.
CPC ............. *H04L 5/0044* (2013.01); *H04W 4/70* (2018.02); *H04W 4/80* (2018.02); *H04W 8/005* (2013.01); *H04W 28/0289* (2013.01); *H04W 76/14* (2018.02); *H04L 5/0007* (2013.01); *H04L 5/0082* (2013.01); *H04W 72/0446* (2013.01); *H04W 92/18* (2013.01)

(58) Field of Classification Search
CPC .............. H04W 72/0446; H04W 92/18; H04L 5/0032; H04L 5/0037; H04L 5/0044; H04L 5/0007; H04L 5/0082
See application file for complete search history.

(56) References Cited

U.S. PATENT DOCUMENTS

| | | | |
|---|---|---|---|
| 2013/0157676 A1 | 6/2013 | Baek et al. | |
| 2013/0225184 A1 | 8/2013 | Liu et al. | |
| 2013/0258996 A1 | 10/2013 | Jung et al. | |
| 2013/0308551 A1 | 11/2013 | Madan et al. | |
| 2014/0094183 A1 | 4/2014 | Gao et al. | |
| 2015/0085818 A1* | 3/2015 | Huang | H04L 5/0062 370/330 |
| 2015/0215903 A1 | 7/2015 | Zhao et al. | |
| 2015/0327315 A1 | 11/2015 | Xue et al. | |
| 2016/0006546 A1 | 1/2016 | Yi et al. | |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.1.0, Mar. 2014, pp. 1-57, 3GPP Organizational Partners.

Ericsson, "Discovery Resource Allocation", R1-141388, 3GPP TSG RAN WG1 Meeting #76bis, Shenzhen, China, Mar. 31-Apr. 4, 2014, pp. 1-3. 3GPP.

InterDigital, "On Control Signaling for D2D Broadcast Communication", R1-141558, 3GPP TSG-RAN WG1 Meeting #76bis, Shenzhen, China, Mar. 31-Apr. 4, 2014, pp. 1-4. 3GPP.

International Search Report for International Patent Application No. PCT/KR2015/004652, dated Aug. 18, 2015.

Written Opinion for International Patent Application No. PCT/KR2015/004652, dated Aug. 18, 2015.

Extended European search report for European Patent Application No. 15 789 920.4, dated Sep. 12, 2017.

Office Action for European Patent Application No. 15 789 920.4, dated Apr. 20, 2018.

Office Action for European Patent Application No. 15 789 920.4, dated Aug. 24, 2018.

The First Office Action for Chinese Patent Application No. 201580024351.9, dated Jul. 25, 2018.

The Second Office Action for Chinese Patent Application No. 201580024351.9, dated Apr. 17, 2019.

Chairman's Notes of Agenda Item 7.2.7 LTE Device to Device Proximity Services 3GPP TSG RAN WG1 Meeting #76bis, Shenzhen, China, Mar. 31-Apr. 4, 2014 R1-141874.

3GPP TR 36.885 V0.4.0 (Nov. 2015) 3rd Generation Partnership Project; Technical Specification Group Radio Access Network; Study on LTE-based V2X Services;(Release 14) R1-157850.

\* cited by examiner

APPARATUS AND METHOD FOR TRANSMITTING DATA THROUGH DEVICE TO DEVICE COMMUNICATION

CROSS-REFERENCE TO RELATED APPLICATIONS

This application is a continuation of U.S. application Ser. No. 16/874,021, filed on May 14, 2020, which is a continuation of U.S. application Ser. No. 16/111,103, filed on Aug. 23, 2018, which is a continuation of U.S. application Ser. No. 14/708,013, filed on May 8, 2015, which claims priority from and the benefit of Korean Patent Application No. 10-2014-0055359, filed on May 9, 2014, each of which is hereby incorporated by reference in its entirety.

BACKGROUND

1. Field

Exemplary embodiments relate to wireless communication, and more particularly, to a method and apparatus for transmitting data through Device-to-Device (D2D) communication.

2. Discussion of the Background

An amount of data transmitted through wireless communication has gradually increased. However, the frequency resources that service providers can provide are limited and have become increasingly saturated, and thus, mobile carriers continuously develop technologies for discovering new frequencies and improving efficient use of frequencies. One of the actively studied technologies to ease the frequency resource shortage and to create a new mobile communication service is Device-to-Device (D2D) communication technology.

D2D communication refers to a technology in which User Equipments (UEs) which are geometrically adjacent to one another, directly transmit and receive information without passing through an infrastructure, such as a base station. In the initial stage, the D2D communication technology was developed and standardized mostly in a non-licensed band such as Wi-Fi, Direct, Bluetooth, which have been already commercialized. However, recently, the development of technologies and standardization for supporting D2D communication in a cellular system that uses a licensed band, are underway. Representatively, the $3^{rd}$ Generation Partnership Project (3GPP), which is a mobile communication standardization association, actively conducts D2D communication technology standardization that is referred to as Proximity-based services (ProSe), which is one of the new technologies included in Long Term Evolution (LTE).

SUMMARY

Exemplary embodiments provide a method and apparatus for transmitting data through Device-to-Device (D2D) communication.

An exemplary embodiment provides a method of transmitting data through a device-to-device (D2D) communication between user equipments (UEs), the method including: generating, at a first UE, first D2D data, the first D2D data corresponding to a transport block (TB) unit; and transmitting, from the first UE to a second UE, the first D2D data through at least one D2D communication resource, the at least one D2D communication resource being based on a sub-RPT (sub-resource pattern for transmission). An RPT defined in a D2D resource pool is configured based on the sub-RPT, and the sub-RPT indicates the at least one D2D communication resource for the transmission of the first D2D data among at least two D2D communication candidate resources. An exemplary embodiment provides a first user equipment (UE) to transmit data through a device-to-device (D2D) communication between user equipments, the first UE including: a radio frequency unit to transceive a wireless signal; and a processor to process a data mapping to a resource. The processor is configured to generate first D2D data, the first D2D data corresponding to a transport block (TB) unit; the radio frequency unit transmits, to a second UE, the first D2D data through at least one D2D communication resource, the at least one D2D communication resource being based on a sub-RPT (sub-resource pattern for transmission); an RPT defined in a D2D resource pool is configured based on the sub-RPT; and the sub-RPT indicates the at least one D2D communication resource for the transmission of the first D2D data among at least two D2D communication candidate resources.

In D2D communication, a User Equipment (UE) may execute at least one transmission of D2D data based on a predetermined resource unit that may transmit data, without a collision. Therefore, capability of D2D data transmission may be improved.

DETAILED DESCRIPTION OF THE ILLUSTRATED EMBODIMENTS

Figure 1:
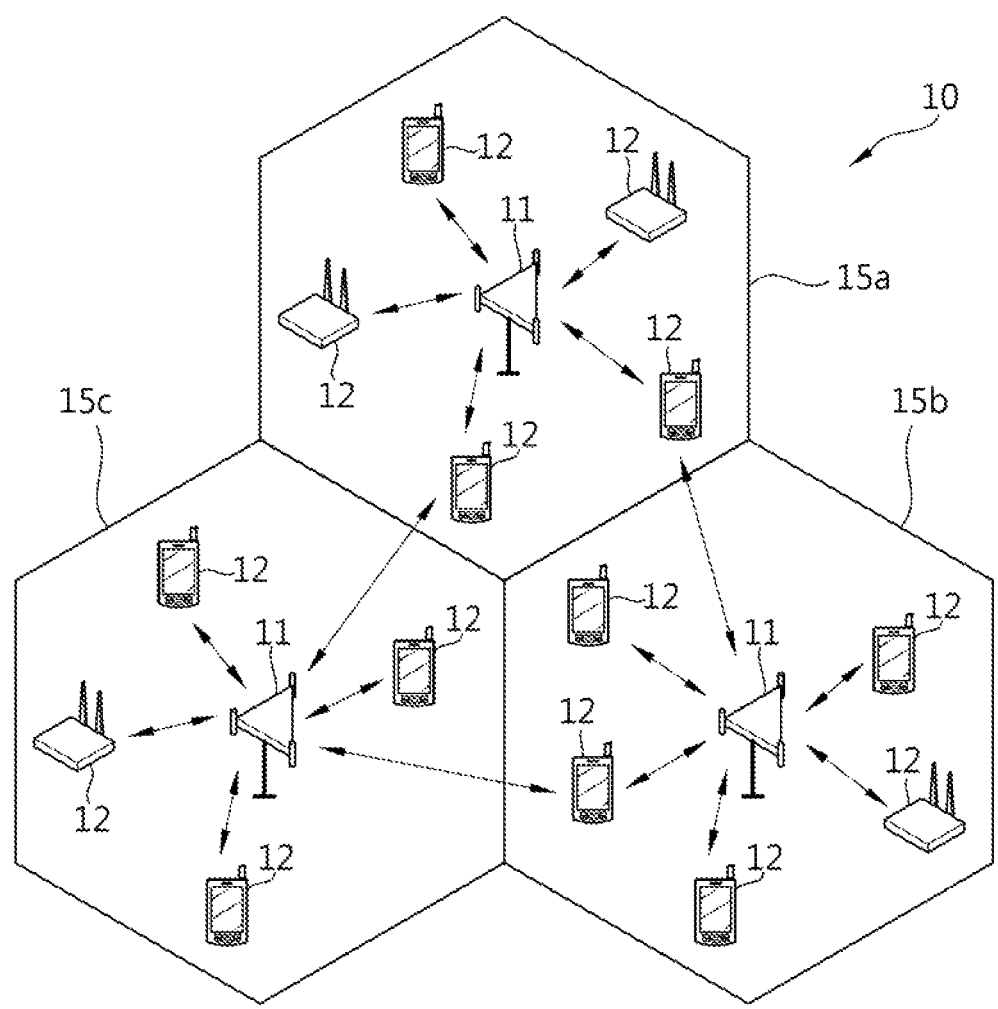
FIG. 1 is a diagram illustrating a network architecture of a wireless communication system, according to one or more exemplary embodiments.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

The present specification provides descriptions in association with a communication network, and tasks executed in the communication network may be performed in the process where a system (for example, a base station) that manages the corresponding communication network controls the network and transmits data, or may be performed in a User Equipment (UE) that is linked to the corresponding network.

FIG. 1 is a diagram illustrating a network architecture of a wireless communication system, according to one or more exemplary embodiments.

Referring to FIG. 1, a wireless communication system 10 may provide a communication service between a Base Station (BS) and a User Equipment (UE). In a wireless communication system, a UE and a BS may wirelessly transmit and receive data. Also, the wireless communication system may support Device-to-Device (D2D) communication between UEs. The wireless communication system that supports the D2D communication will be described later.

A BS 11 of the wireless communication system 10 may provide a communication service to a UE existing in a transmission coverage of the BS 11, through a predetermined frequency band. The coverage within which a BS provides a service is also referred to as a site. The site may include various areas 15a, 15b, and 15c, which may be referred to as sectors. The sectors included in the site may be identified based on different identifier from one another. Each sector 15a, 15b, and 15c may be construed as a part of the area that the BS 11 covers.

A base station 11 communicates with User Equipment (UE) 12 and may be referred to as eNB (evolved-NodeB), BTS (Base Transceiver System), Access Point, femto base station, Home nodeB, relay and Remote Radio Head (RRH).

User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A cell inclusively refers to various coverage areas, such as mega cell, macro cell, micro cell, pico cell, and femto cell. A cell may be used as a term for indicating a frequency band that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model in association with a communication system. A physical layer belonging to the L1 among the layers, provides a information transfer service using a physical channel.

A plurality of physical channels is defined in the physical layer, and data may be transmitted through the physical channel. A Physical Downlink Control Channel (PDCCH) may include a resource allocation and transmission format of a Downlink Shared Channel (DL-SCH) and resource allocation information of an Uplink Shared Channel (UL-SCH). Also, the PDCCH may transmit a random access response which is transmitted on a Physical Downlink Shared Channel (PDSCH), a Transmission Power Control (TPC) command with respect to individual UEs in a UE group, and the like. A plurality of PDCCHs may be defined with respect to a predetermined UE in a control area. The UE may monitor the plurality of PDCCHs so as to obtain control information.

Control information of a physical layer mapped to a PDCCH is referred to as a Downlink Control Information (DCI). That is, the DCI is transferred through the PDCCH. The DCI may include uplink resource grant information, downlink resource assignment information, uplink transmission power control information, control information for paging, control information for indicating a Random Access (RA) response, and the like.

Figure 2:
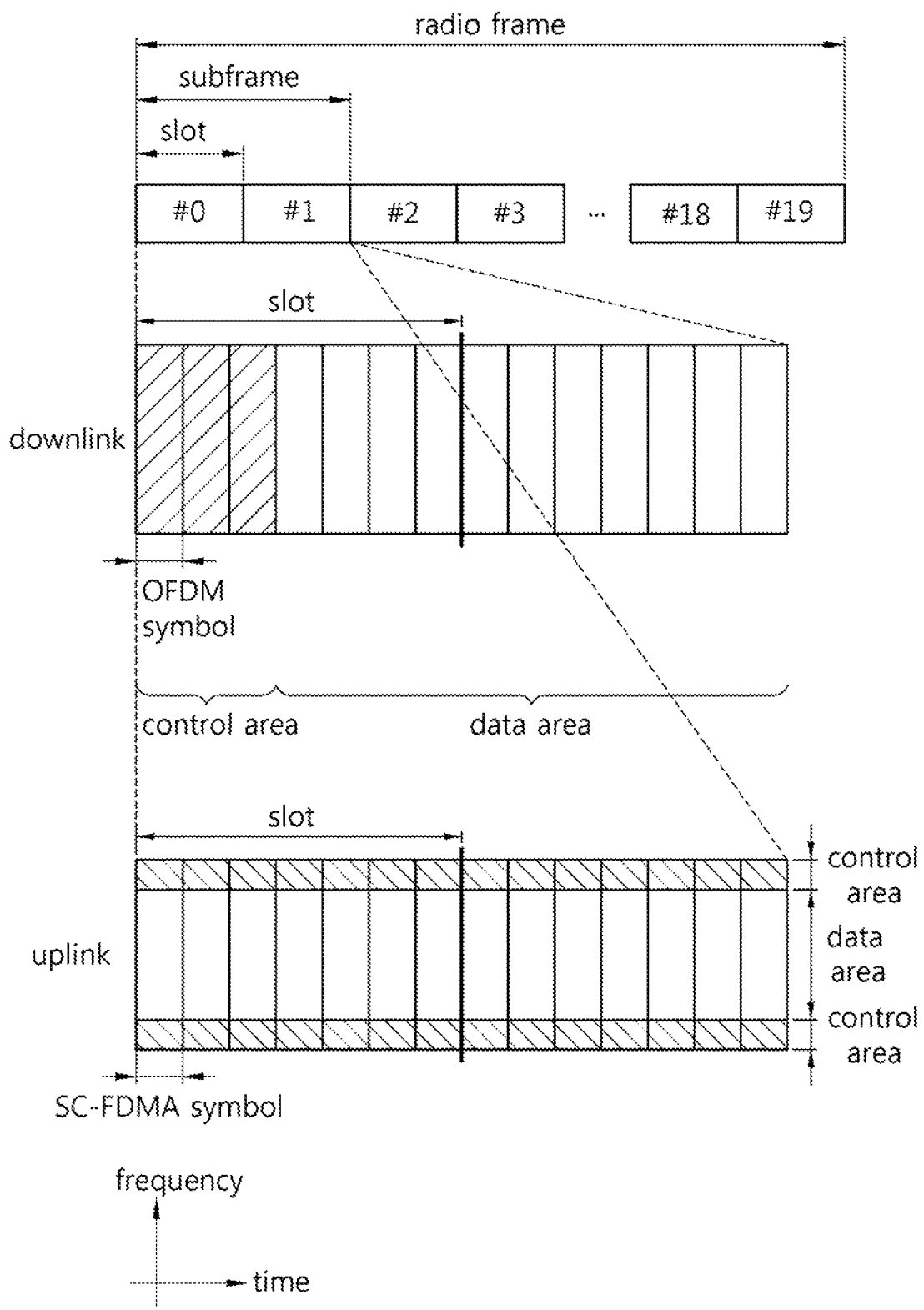
FIG. 2 and FIG. 3 are diagrams schematically illustrating a structure of a Radio Frame (RF), according to one or more exemplary embodiments.
Figure 3:
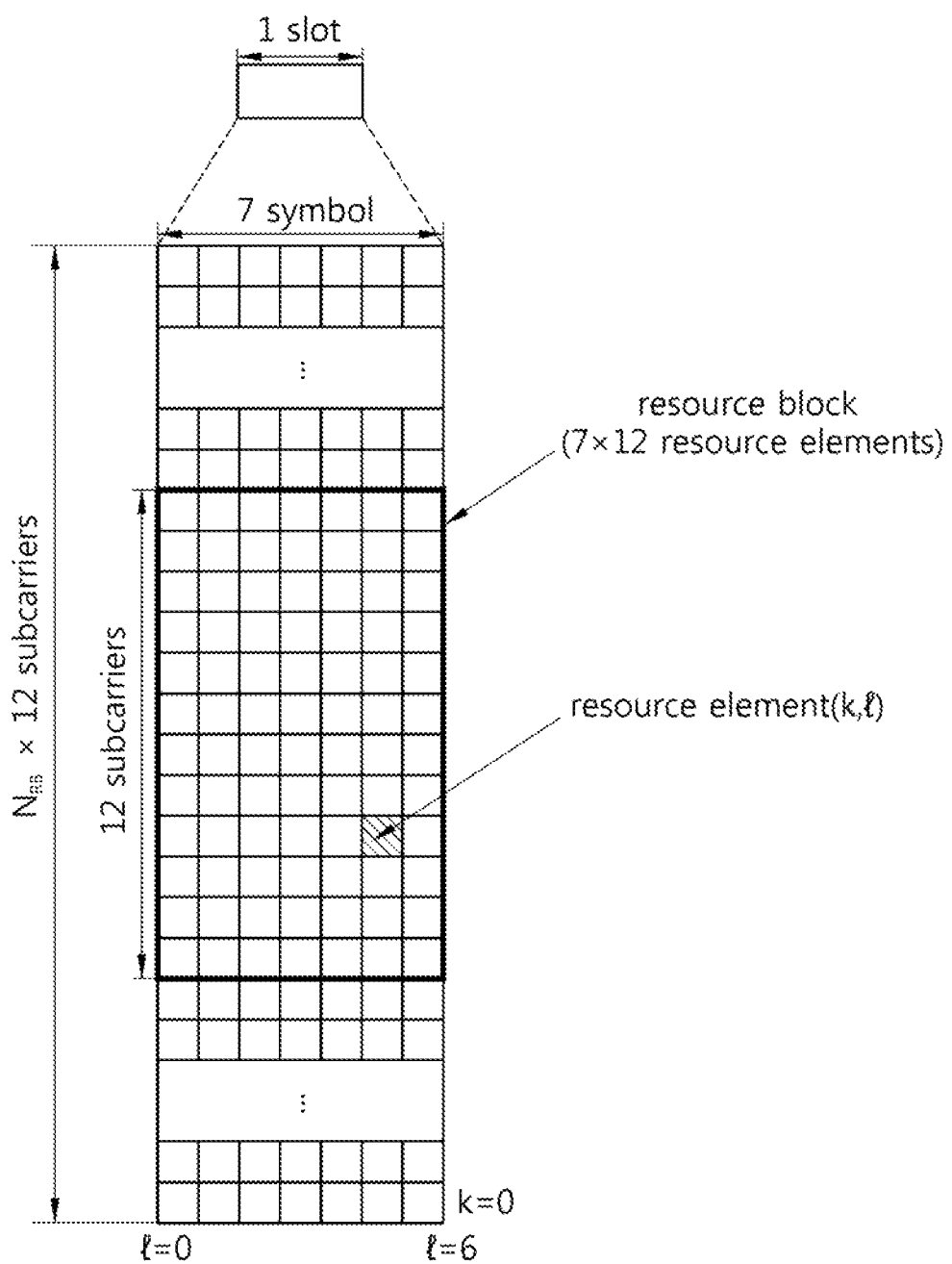

FIG. 2 and FIG. 3 are diagrams schematically illustrating a structure of a Radio Frame (RF), according to one or more exemplary embodiments.

Referring to FIG. 2 and FIG. 3, a radio frame may include ten subframes. A single subframe includes two slots. A time (a length) in which a single subframe is transmitted is referred to as a Transmission Time Interval (TTI). Referring to FIG. 2, for example, a length of a single subframe (1 subframe) may be 1 ms, and a length of a single slot (1 slot) may be 0.5 MS.

A single slot may include a plurality of symbols in a time domain. For example, in a wireless system that uses Orthogonal Frequency Division Multiple Access (OFDMA) in a Downlink (DL), the symbol may be an Orthogonal Frequency Division Multiplexing (OFDM) symbol and in a wireless system that uses Single Carrier-Frequency Division Multiple Access (SC-FDMA) in an Uplink (UL), the symbol may be an SC-FDMA symbol. An expression associated with a symbol period of the time domain may not be limited by a multiple access scheme or name.

The number of symbols included in a single slot may be different based on a length of a Cyclic Prefix (CP). For example, in the case of a normal CP, seven symbols are included in a single slot, and in the case of an extended CP, six symbols are included in a single slot.

A Resource Block (RB) is a resource allocation unit, and may be a time-frequency resource corresponding to 180 kHz in a frequency axis and a single slot in a time axis. A Resource Element (RE) refers to a minimum time-frequency resource to which a modulated symbol of a data channel, a modulated symbol of a control channel, or the like is mapped, and is a resource corresponding to a single symbol in the time domain and a single subcarrier in the frequency domain.

In a wireless communication system, an uplink channel or a downlink channel may need to be estimated for transmission/reception of data, acquisition of system synchronization, channel information feedback, and the like. A UE and/or a BS may adjust distortion of a signal generated by a rapid change in channel environment, so as to execute channel estimation to restore a transmitted signal.

The UE and the BS may use a Reference Signal (RS) to execute channel estimation between the UE and the BS.

In the case of downlink channel estimation, a UE may be aware of information associated with a reference signal received from a BS. Therefore, the UE may estimate a channel based on the reference signal received from the BS, adjust a channel value, and accurately obtain downlink data transmitted from the BS.

In the case of uplink channel estimation, this may be executed in the same manner as the above described downlink channel estimation, except for the fact that a sender of a reference signal is a UE and a receiver is a BS.

Generally, a reference signal may be generated based on a reference signal sequence. At least one of various sequences having a good correlation property may be used as the RS sequence. For example, a Constant Amplitude Zero Auto-Correlation (CAZAC) sequence such as Zadoff-Chu (ZC) sequence or the like, or a Pseudo-Noise (PN) sequence such as an m-sequence, a gold sequence, a Kasami sequence, or the like, may be used as the RS sequence. In addition, various other sequences having a good correlation property may be used based on a system condition. In addition, the RS sequence may be cyclic-extended or truncated so as to adjust a length of the sequence, or may be modulated in various forms such as a Binary Phase Shift Keying (BPSK), a Quadrature Phase Shift Keying, or the like, for being mapped to a RE.

A Cell-specific RS, a Multimedia Broadcast and multicast Single Frequency Network (MBSFN) RS, a UE-specific RS, a Positioning RS (PRS), a Channel State Information (CSI) RS (CSI-RS), and the like may be used as a reference signal in a downlink.

The UE-specific RS is a RS that a predetermined UE or a predetermined UE group in a cell receives. The UE-specific RS is mostly used for demodulation of downlink data with respect to a predetermined UE or a predetermined UE group, and thus, it is referred to as a downlink Demodulation RS (DM-RS).

A UE may transmit an uplink RS signal to a BS through an uplink, in the same manner as the downlink. The uplink RS may include an uplink DM-RS and an uplink SRS. The uplink DM-RS may be used for coherent demodulation of a BS with respect to Physical Uplink Shared Channels (PUSCHs) and a Physical Uplink Control Channel (PUCCH). Therefore, the uplink DM-RS may be allocated to a frequency bandwidth where a PUSCH or a PUCCH is allocated.

The uplink SRS may be used when a BS executes channel estimation for uplink channel-dependent scheduling and link adaptation. When sufficient reciprocity exists between an uplink and a downlink, that is, when an uplink channel and a downlink channel have sufficiently similar characteristics, the uplink SRS may also be used for estimation of a downlink channel state.

Figure 4:
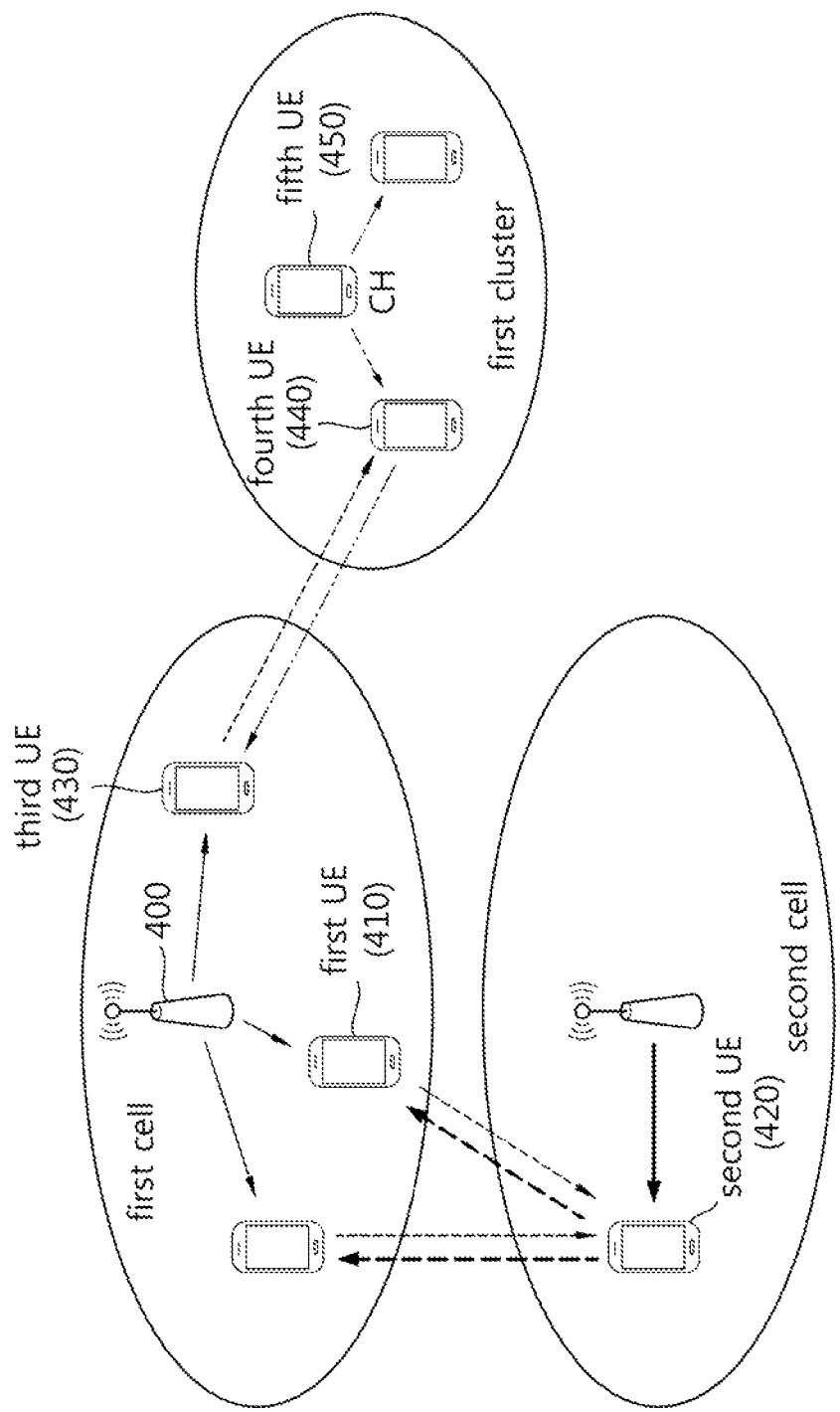
FIG. 4 is a conceptual diagram illustrating a Device-to-Device (D2D) communication, according to one or more exemplary embodiments.

FIG. 4 is a conceptual diagram illustrating a Device-to-Device (D2D) communication, according to one or more exemplary embodiments.

D2D communication refers to a technology in which UEs directly receive and transmit data. Hereinafter, a UE disclosed in embodiments of the present invention is assumed to support D2D communication.

When UEs located close to one another execute D2D communication in a cellular system, loads on an evolved NodeB (eNodeB) may be dispersed. In addition, when UEs execute D2D communication, a UE transmits data a relatively short distance, and thus, transmission power consumption and transmission latency of the UE may decrease. In addition, from the perspective of the whole system, the existing cellular-based communication and the D2D communication use identical resources, and thus, frequency utilization efficiency may be improved.

The D2D communication may be classified into a communication method of a UE located within a network coverage (base station coverage) and a communication method of a UE located outside a network coverage (base station coverage).

Referring to FIG. 4, the communication between a first UE 410 located in a first cell and a second UE 420 located in a second cell may be D2D communication between a UE included in a network coverage and a UE included in a network coverage. The communication between a fourth UE 440 located in the first cluster and a fifth UE 450 located in the first cluster may be D2D communication between the UEs located outside a network coverage.

The D2D communication may include a discovery process that executes discovery for communication between UEs and a direct communication process in which UEs transmit and receive control data and/or traffic data. The D2D communication may be used for various purposes. For example, D2D communication within a network coverage and D2D communication outside a network coverage may be used for public safety. The D2D communication outside a network coverage may be used for only the public safety.

As an embodiment in association with executing D2D communication, a BS 400 may transmit D2D resource allocation information to the first UE 410. The first UE 410 is a UE located within the coverage of the BS 400. The D2D resource allocation information may include allocation information associated with a transmission resource and/or reception resource that may be used for D2D communication between the first UE 410 and another UE (for example, a second UE 420).

The first UE 410 that receives the D2D resource allocation information from the BS 400, may transmit the D2D resource allocation information to the second UE 420. The second UE 420 may be a UE located outside the coverage of the BS 400. The first UE 410 and the second UE 420 may execute D2D communication based on the D2D resource allocation information. Particularly, the second UE 420 may obtain information associated with the D2D communication resource of the first UE 410. The second UE 420 may receive data transmitted from the first UE 410, through a resource indicated by the information associated with the D2D communication resource of the first UE 410.

In the D2D communication, a UE may transmit control data to another UE. A separate channel (for example, a Physical Uplink Control Channel (PUCCH)) for transmitting control data may not be defined in the D2D communication. When the control channel is not defined in the D2D communication, a UE may use various methods for transmitting control data for D2D communication. In the D2D communication, the control data may be expressed as Scheduling Assignment (SA) information. In the D2D communication, actual traffic data (e.g., data transmitted through shared channel, such as physical sidelink shared channel) distinguished from control data, may be expressed as D2D data.

The D2D communication within network coverage may be expressed as first mode communication, and the D2D communication outside network coverage may be expressed as second mode communication. In the first mode communication, a BS or a relay node schedules accurate information associated with resources for the D2D communication between UEs. Particularly, according to the first mode communication, a BS transmits, to a UE, resource allocation information associated with control data (or SA data) and resource allocation information associated with traffic data (or D2D data).

According to the second mode communication, a UE may directly schedule resources for D2D communication, based on a D2D resource pool. Particularly, in the second mode communication, resource allocation information for transmission of control data and resource allocation information associated with traffic data may be selected by a UE from the D2D resource pool. The D2D resource pool may be preconfigured or semi-statically allocated.

Figure 5:
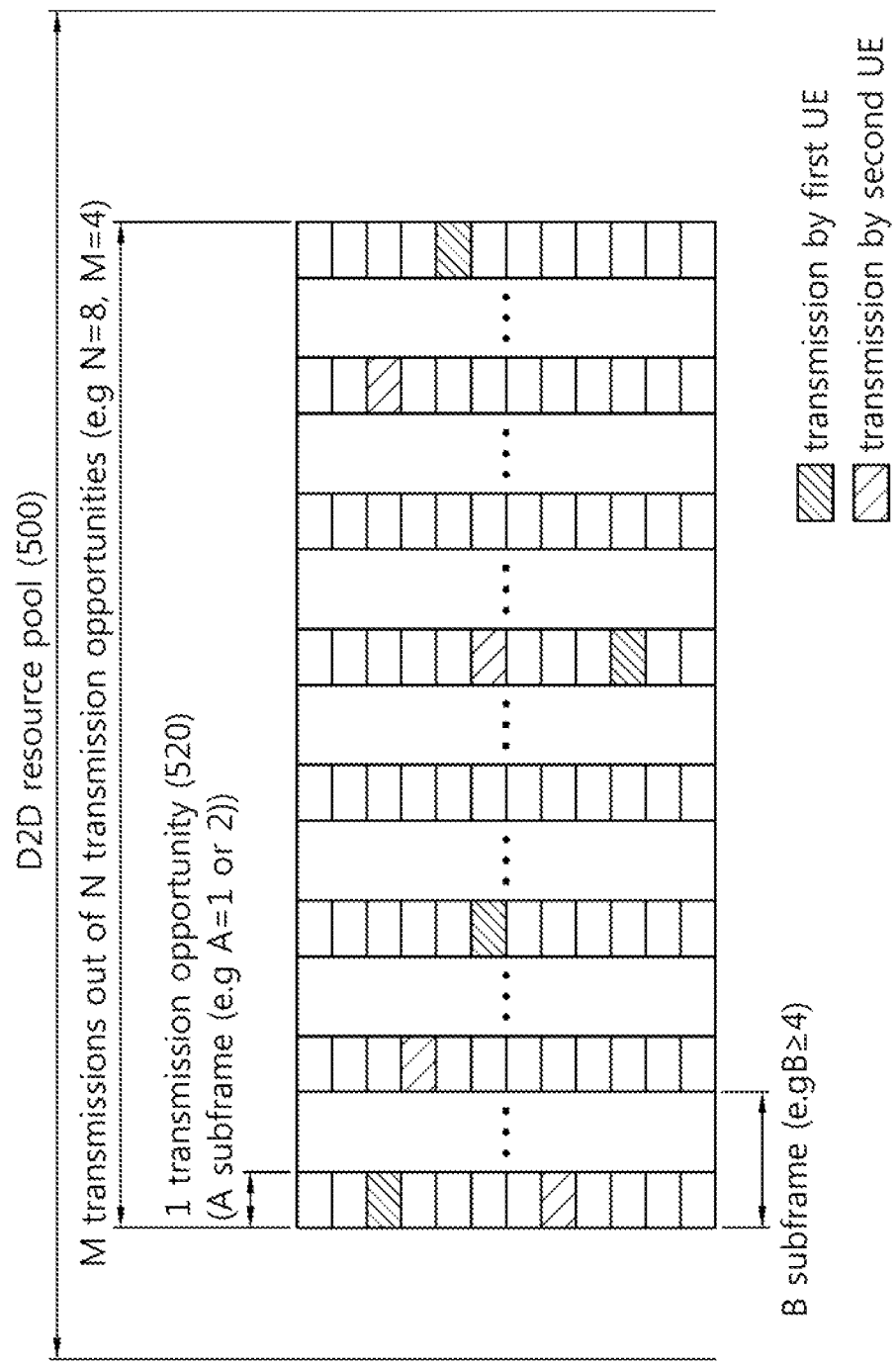
FIG. 5 illustrates a resource allocation unit defined in D2D communication, according to one or more exemplary embodiments.

FIG. 5 illustrates a resource allocation unit defined in D2D communication, according to one or more exemplary embodiments.

Referring to FIG. 5, resources for D2D communication may be defined based on a D2D resource pool 500, transmission opportunities 520, and a Resource Pattern for Transmission (RPT).

The D2D resource pool 500 may be a set of resources that may be used for D2D communication (hereinafter referred to as D2D communication candidate resources). Particularly, the D2D resource pool 500 may be a set of resources (D2D communication candidate resources) indicated based on transmission opportunities.

The transmission opportunities 520 may correspond to the D2D communication candidate resources. A plurality of transmission opportunities may be defined in the D2D resource pool 500. For example, the transmission opportunities (or D2D communication candidate resources) may be defined to be contiguous or discontiguous, based on a unit of at least one subframe (for example, one or two subframes) among consecutive subframes. That is, transmission opportunities that are defined based on a unit of one or two subframes among consecutive subframes, may be contiguous, or may be discontiguous at intervals of several subframes. Particularly, when the transmission opportunities are defined to be discontiguous, the consecutive subframes may be divided into four or more subframe units and a single preceding subframe from among the four or more subframe units may be indicated as a transmission opportunity (or a D2D communication candidate resource).

The RPT may include pattern information of a time resource and/or a frequency resource (hereinafter referred to as a D2D communication resource) actually used for transmission of control data and/or D2D data of a UE, from among D2D communication candidate resources. The RPT may be defined by various patterns, and may be defined by various lengths. For example, the RPT may be a pattern associated with a D2D communication resource from among D2D communication candidate resources defined in the single D2D resource pool 500.

Particularly, a UE may transmit control data on a D2D communication resource indicated based on an RPT (an RPT-based D2Dcommunication resource). Through a single RPT-based D2D communication resource, a single control data unit may be transmitted or a plurality of control data units may be transmitted. In the same manner, a UE may transmit D2D data on an RPT-based D2D communication resource. The D2D data may be transmitted based on a Transmission Block (TB) unit, on an RPT-based D2D communication resource. Through a single RPT-based D2D communication resource, D2D data of a single TB unit may be transmitted or D2D data of a plurality of TB units may be transmitted.

Figure 6:
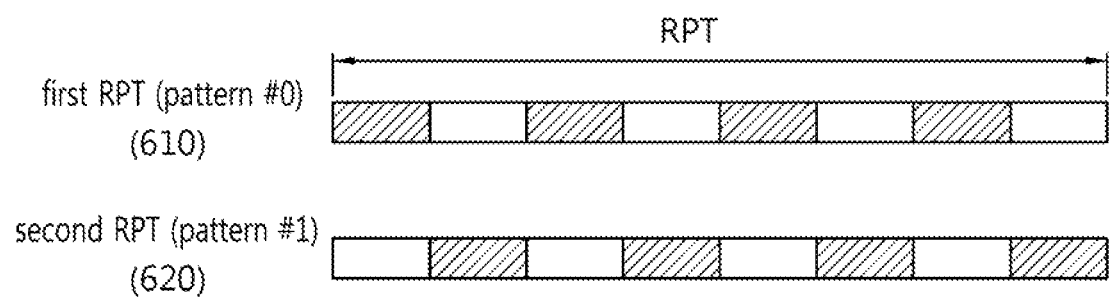
FIG. 6 is a conceptual diagram illustrating an RPT, according to one or more exemplary embodiments.

FIG. 6 is a conceptual diagram illustrating an RPT, according to one or more exemplary embodiments.

FIG. 6 illustrates D2D communication resources based on a first RPT 610 and D2D communication resources based on a second RPT 620 among D2D communication candidate resources corresponding to a total of N transmission opportunities (N=8).

Each RPT may indicate M transmission opportunities from among the N transmission opportunities for transmitting D2D data. In other words, each RPT may indicate M D2D communication resources out of N D2D communication candidate resources.

A UE may transmit control data and/or D2D data on M D2D communication resources that are based on an RPT The UE may receive control data and/or D2D data of another UE, on N-M D2D communication candidate resources, which remain after excluding M D2D communication resources from the N D2D communication candidate resources.

In the case of FIG. 6, a UE transmits control data and/or D2D communication data through four D2D communication resources based on a single RPT, and receives, from another UE, control data and/or D2D communication data on four D2D communication candidate resources remaining after excluding D2D communication resources.

The first RPT 610 and the second RPT 620 may be orthogonal each other. In particular, when D2D communication resources based on different RPTs do not overlap from the perspective of time, data transmitted through an RPT-based D2D communication resource and data transmitted through the other RPT-based D2D communication resource may not collide Particularly, it is assumed that a first UE executes a first RPT-based D2D communication and a second UE executes a second RPT-based D2D communication. In this instance, the first UE may transmit D2D data to the second UE without a collision. In the same manner, the second UE may transmit D2D data to the first UE without a collision.

When it is defined that a plurality of RPTs are orthogonal each other, the orthogonality may be secured with respect to only ⌊N/M⌋ or fewer UEs (here, N denotes the number of D2D communication candidate resources and M denotes the number of D2D communication resources). In the case of FIG. 6, ⌊N/M⌋=2. In other words, merely ⌊N/M⌋ RTPs satisfy the orthogonality.

Accordingly, when the number of UEs that execute D2D communication exceeds ⌊N/M⌋, the orthogonality between data that are transmitted during D2D communication between UEs may totally break down. Therefore, transmission or reception of control data or D2D data through D2D communication may not be executed.

Figure 7:
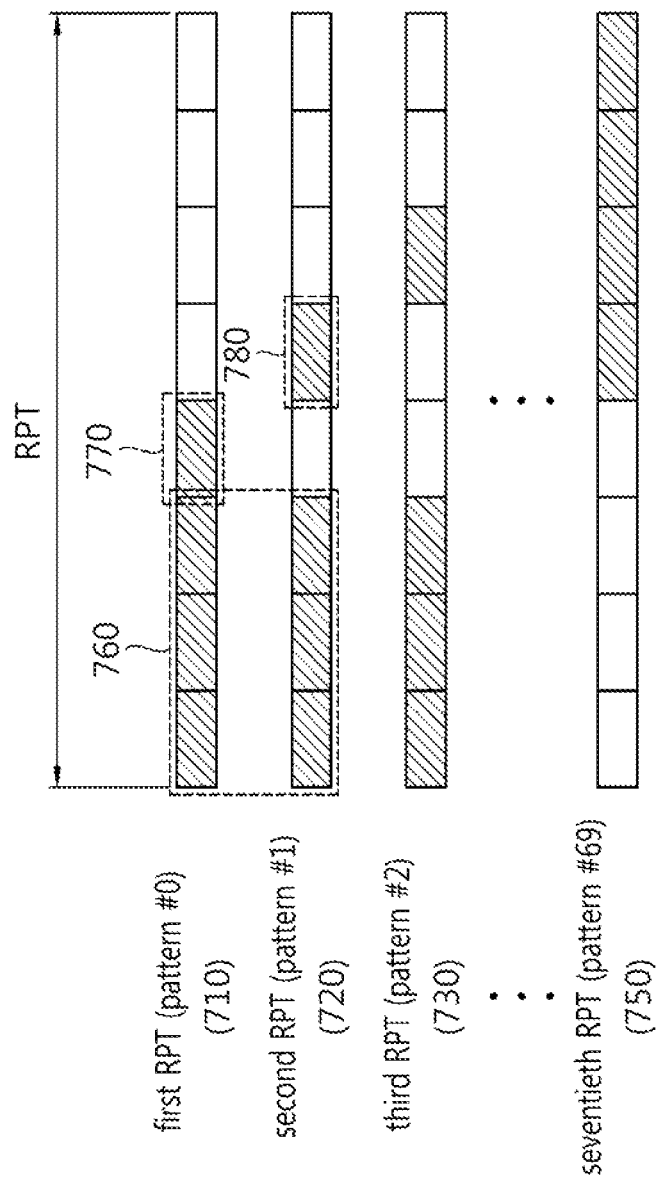
FIG. 7 is a conceptual diagram illustrating an RPT, according to one or more exemplary embodiments.

FIG. 7 is a conceptual diagram illustrating an RPT, according to one or more exemplary embodiments.

FIG. 7 illustrates D2D communication resources based on a first RPT (pattern #0) 710 to a seventieth RPT (pattern #69) 750 among D2D communication candidate resources corresponding to a total of N transmission opportunities (N=8).

In the same manner as FIG. 6, each RPT may be pattern information associated with M D2D communication resources out of N D2D communication candidate resources. A UE may transmit control data or D2D data on the M D2D communication resources. The UE may receive control data or D2D data of another UE, on N-M D2D communication candidate resources, which remain after excluding the M D2D communication resources from the N D2D communication candidate resources.

The first RPT 710 to the seventieth RPT 750 may indicate four D2D communication resources out of eight D2D communication candidate resources. Many of the first RPT 710 to the seventieth RPT 750 may not orthogonal each other. For example, referring to the first RPT 710 and a second RPT 720, a collision occurs in three D2D communication resources 760 and a collision does not occur in a single D2D communication resource 770 and 780. As another example, referring to the first RPT 710 and the seventieth RPT 750, a collision does not occur in all D2D communication resources.

In the case of FIG. 7, when a UE transmits D2D data through M D2D communication resources, at least zero to at most M−1 D2D communication resources may collide with D2D communication resources of another UE.

That is, D2D communication resources have at most M−1$^{th}$ collisions, the UE may execute D2D communication through one of the M communication resources. Therefore, the performance of D2D communication may be deteriorated.

Also, when RPTs are defined as shown in FIG. 7, the total number of RPTs may be (N,M)=N!/M!(N-M)! (here, N denotes the number of D2D communication candidate resources and M denotes the number of D2D communication resources). Therefore, many unnecessary RPTs may be defined and a signaling overhead for indicating a single RPT may be increased.

Hereinafter, embodiments of the present invention will disclose a method of overcoming the drawback of resource allocation in D2D communication described through FIG. 6 and FIG. 7.

Figure 8:
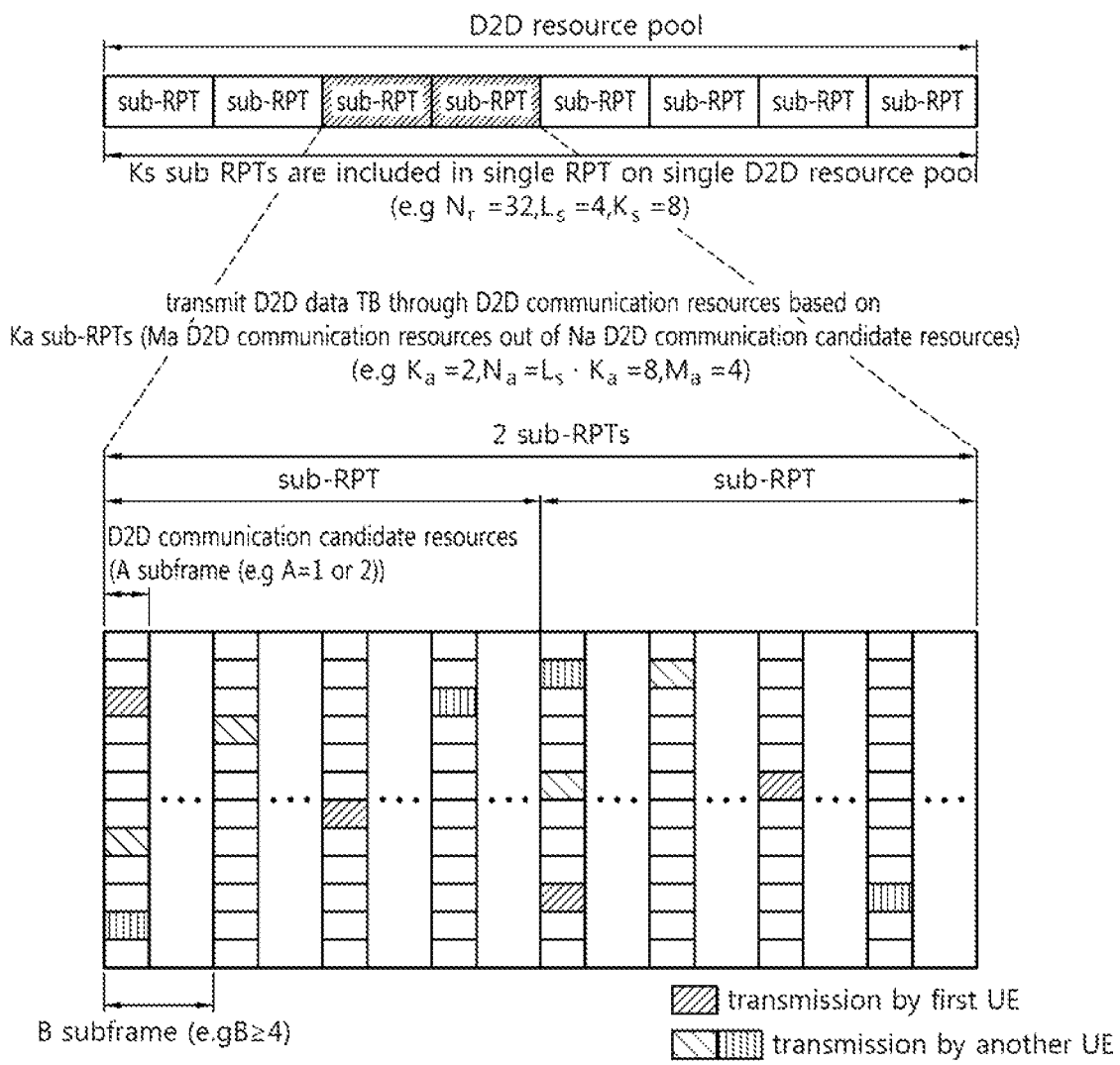
FIG. 8 is a conceptual diagram illustrating a resource allocation method in D2D communication, according to one or more exemplary embodiments.

FIG. 8 is a conceptual diagram illustrating a resource allocation method in D2D communication, according to one or more exemplary embodiments.

Referring to FIG. 8, in a D2D communication resource allocation method according to an embodiment of the present invention, a sub-RPT is newly defined and a UE transmits control data and D2D data based on the sub-RPT.

The sub-RPT according to an embodiment of the present invention may be defined as follows. A single RPT include a plurality of sub-RPT (Ks RPTs). A single sub-RPT may a pattern of a D2D communication resource defined from Ls (for example, Ls=4) D2D communication candidate resources. Therefore, a single RPT may correspond to a pattern of Nr(=Ks·Ls) D2D communication candidate resources.

A single D2D communication candidate resource may correspond to A (for example, one or two) subframes. When A is equal to 1, a single subframe may be a single D2D communication candidate resource, and when A is equal to 2, two subframes may be a single D2D communication candidate resource.

B−1 subframes may exist between one communication candidate resource and a subsequent communication candidate resource. That is, a second communication candidate resource may exist B−1 subframes after a first communication candidate resource. Considering the assumption of an uplink decoding time of a PUSCH in an existing LTE system, B≥4 (for example, B=5). A value of B may be pre-configured based on the number of D2D communication candidate resources that form a D2D resource pool (or the length of the D2D resource pool) and may be signaled, or may be pre-defined in the specifications.

D2D communication resources based on a single sub-RPT may transmit a single control data transmission unit or a single D2D data transmission unit. In this instance, a single control data transmission unit may be a single Scheduling Assignment (SA) unit, and a single D2D data transmission unit may be a single Transport Block (TB) unit.

A TB may be a data unit transmitted in Medium Access Control (MAC) layer, and may be transmitted by an MAC end at a Transmission Time Interval (TTI) of 1 ms. A TB transmitted through MAC may pass through a procedure such as TB-based Cyclic Redundancy Check (CRC) insertion, channel coding, scrambling, modulation, or the like, and may be transmitted through D2D communication resources based on a single sub-RPT.

In particular, a D2D communication resource based on a sub-RPT may be a plurality of D2D communication resources based on a sub-RPT. An identical TB may be iteratively transmitted through each of the plurality of D2D communication resources based on a sub-RPT. That is, each of the plurality of D2D communication resources based on a sub-RPT may iteratively transmit an identical TB. That is, only a single TB including identical data (for example, D2D data) may be transmitted through D2D communication resources based on a single sub-RPT. A plurality of TBs including different data may not be transmitted through D2D communication resources based on a single sub-RPT. Particularly, a first TB may be transmitted through a first D2D communication resource based on a first sub-RPT, and a second TB may be transmitted through a second D2D communication resource based on a second sub-RPT. As another example, a first TB may be transmitted through a first D2D communication resource based on a first sub-RPT and a second D2D communication resource based on a second sub-RPT. As a matter of course, a plurality of different TBs may be transmitted through D2D communication resources based on an RPT which is a set of a plurality of sub-RPTs.

The number of sub-RPT based D2D communication resources may be $L_1$ out of the number ($L_s$) of D2D communication candidate resources (for example, $L_1=L_s/2$).

That is, a single TB including identical data (for example, D2D data) may be iteratively transmitted up to $L_1$ times through the communication resources based on a sub-RPT. A UE may transmit data through $L_1$ D2D communication resources that are based on a sub-RPT, and may receive data from another UE through Ls-$L_1$ remaining D2D communication candidate resources.

According to an exemplary embodiment, first D2D communication resources based on a first sub-RPT and second D2D communication resources based on a second sub-RPT may be configured such that they do not overlap with each other at least one time. Through this method, the first D2D data transmitted through the first D2D communication resources based on the first sub-RPT and the second D2D data transmitted through the second D2D communication resources based on the second sub-RPT may not collide at least one time.

In the case of FIG. 8, a single D2D resource pool may be defined on 160 subframes (160 ms), and A=1, B=5, Ls=4, Ks=8, and Nr=32. Here, A denotes the number of subframes corresponding to a single D2D communication candidate resource, B denotes the number of subframes located between a communication candidate resource and the subsequent (next) communication candidate resource, Ls denotes the number of D2D communication candidate resources for defining a sub-RPT, Ks denotes the number of sub-RPTs included in a single RPT, and Nr denotes the number of D2D communication candidate resources for defining a single RPT.

As another example, a single D2D resource pool may be defined on 80 subframes (80 ms), and A=1, B=5, Ls=4, Ks=4, and Nr=16.

A single TB may be transmitted using Ka sub-RPTs. In this instance, a TB may be transmitted on Ma D2D communication resources out of Na(Ls*Ka) D2D communication candidate resources.

In FIG. 8, in the case of a TB A transmitted by a first UE, for example, Ka=2. In this instance, the TB A may be transmitted through 4 D2D communication resources out of 8 D2D communication candidate resources. That is, in the case of Ls=4, Na and Ma when Ka is 4, 2, and 1 may be (Ka=4, Na=16, Ma=8), (Ka=2, Na=8, Ma=4), and (Ka=1, Na=4, Ma=2), respectively.

Hereinafter, a data transmission method based on a sub-RPT according to an embodiment of the present invention will be described in detail.

Figure 9:
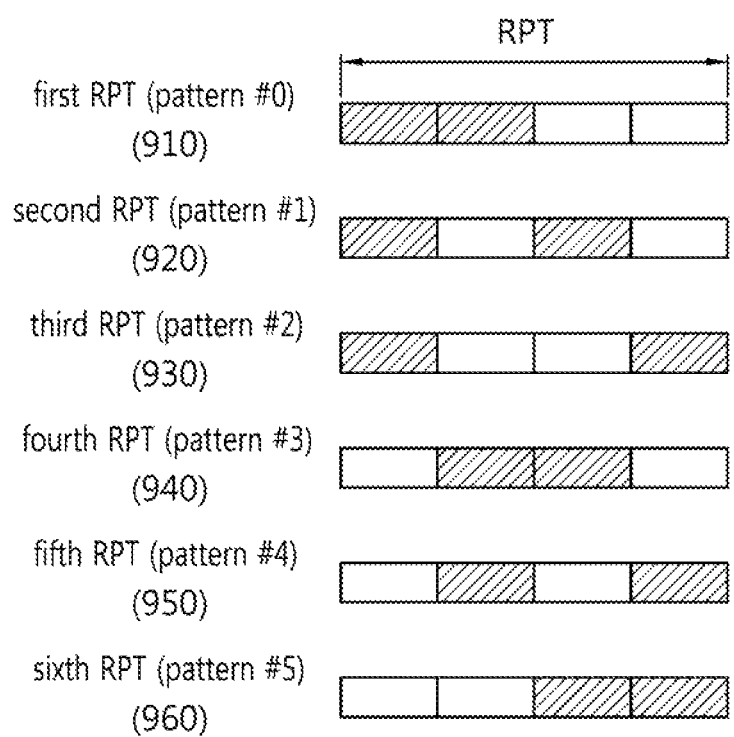
FIG. 9 is a conceptual diagram illustrating a data transmission method based on a sub-RPT, according to one or more exemplary embodiments.

FIG. 9 is a conceptual diagram illustrating a data transmission method based on a sub-RPT, according to one or more exemplary embodiments.

Referring to FIG. 9, a first sub-RPT 910 to a sixth sub-RPT 960 may be defined.

For example, descriptions will be provided under assumption that a single sub-RPT is a pattern of two D2D communication resources out of four D2D communication candidate resources.

A single sub-RPT is a pattern of L/2 (or $\lfloor L/2 \rfloor$ or $\lceil L/2 \rceil$) D2D communication resources out of L D2D communication candidate resources (L is an integer). Hereinafter, for ease of description, it is assumed that L is an even number. A UE may transmit control data and D2D data through L/2 D2D communication resources based on a sub-RPT. Hereinafter, although the description is provided under assumption that D2D data is mostly transmitted on D2D communication resources for ease of the description, control data may also be transmitted.

A UE may transmit D2D data through two D2D communication resources out of four D2D communication candidate resources, based on one of the first sub-RPT 910 to the sixth sub-RPT 960. The UE may receive D2D data from another UE, on two remaining D2D communication candidate resources, which remain after excluding the two D2D communication resources from the four D2D communication candidate resources.

When a single sub-RPT is a pattern of L/2 D2D communication resources defined from L D2D communication candidate resources, first D2D communication resources based on a first sub-RPT and second D2D communication resources based on a second sub-RPT may not overlap in at least L/4 resources to at most L/2 resources. In other words, the first D2D communication resources based on the first sub-RPT and the second D2D communication resources based on the second sub-RPT may overlap in at least zero resources to at most L/4 resources.

That is, when a plurality of UEs executes D2D communication, a UE may transmit D2D data through at least L/4 to at most L/2 D2D communication resources based on a sub-RPT, without a collision.

Particularly, in the case of FIG. 9, when a first UE transmits D2D data based on the first sub-RPT 910 and a second UE transmits D2D data based on a second RPT 920 to the fifth sub-RPT 950, an overlap may occur in one D2D communication resource and an overlap does not occur in the other communication resource. That is, the first UE and the second UE may transmit D2D data through a single D2D communication resource.

As another example, when the first UE transmits D2D data based on the first sub-RPT 910 and the second UE transmits D2D data based on the sixth RPT 960, overlaps may not occur in two D2D communication resources. That is, the first UE and the second UE may transmit D2D data through all the two assigned D2D communication resources.

As described above, the UE may iteratively transmit a single D2D data TB through the plurality of D2D communication resources based on a single sub-RPT. An RPT including K sub-RPTs may transmit at least one TB to at most K different TBs, based on an RPT-based D2D communication resource. All the K sub-RPTs forming a single RPT may transmit a single D2D data TB (a single TB), or the K sub-RPTs forming the single RPT may transmit different D2D data TBs (K different TBs), respectively.

To extend the description to an RPT, an RPT including K sub-RPTs may be a pattern of N/2 D2D communication resources out of N D2D communication candidate resources. Different RPTs may overlap in a total of N/4 D2D communication resources. From the perspective of transmission, a UE may transmit D2D data through at least N/4 D2D communication resources to at most N/2 D2D communication resources, without a collision. Hereinafter, a data transmission method based on an RPT including a plurality of sub-RPTs will be described with reference to FIGS. 10 and 11.

Figure 10:
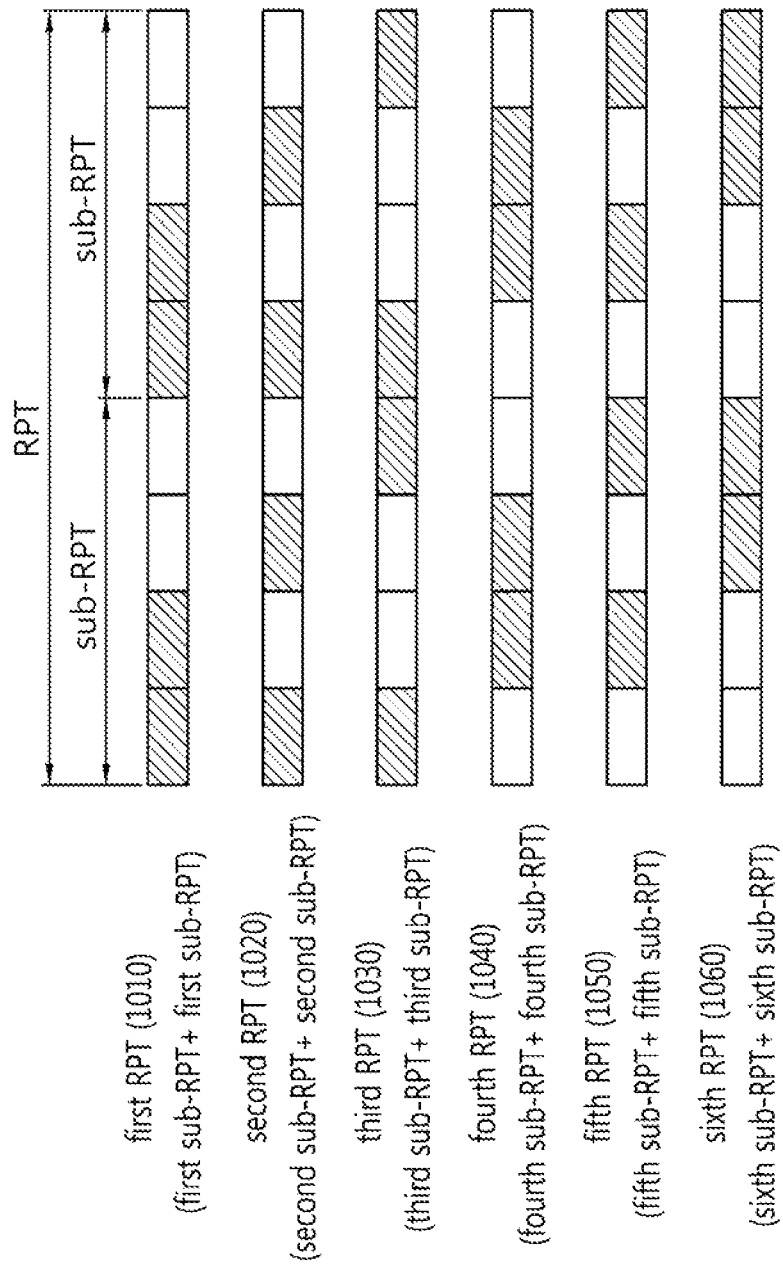
FIG. 10 is a conceptual diagram illustrating a data transmission method based on a sub-RPT, according to one or more exemplary embodiments.

FIG. 10 is a conceptual diagram illustrating a data transmission method based on a sub-RPT, according to one or more exemplary embodiments.

In FIG. 10, a data transmission method based on a sub-RPT will be described, from the perspective of a plurality of sub-RPTs forming a single RPT.

An RPT may include a plurality of sub-RPTs having an identical pattern. For example, the RPT may include a first sub-RPT and the first sub-RPT, or may include a second sub-RPT and the second sub-RPT.

The RPT may be defined in four D2D communication resources out of eight D2D communication candidate resources. From the perspective of a sub-RPT, a collision may occur in at least zero to at most one D2D communication resource. That is, the UE may transmit D2D data through at least one to at most two D2D communication resources. From the perspective of an RPT, a collision may occur in at least zero to at most two D2D communication resources. That is, the UE may transmit D2D data through at least two to at most four D2D communication resources.

Particularly, for example, it is assumed that a first UE transmits D2D data based on a first RPT (first sub-RPT+first sub-RPT) 1010, and a second UE transmits D2D data based on a second RPT (second sub-RPT+second sub-RPT) 1020 to a fifth RPT (fifth sub-RPT+fifth sub-RPT) 1050. In this instance, overlaps may occur in two D2D communication resources out of four D2D communication resources, and an overlap may not occur in the remaining two D2D communication resources. That is, the first UE and the second UE may transmit D2D data through two D2D communication resources.

As another example, it is assumed that the first UE transmits D2D data based on the first RPT (first sub-RPT+first sub-RPT) 1010 and the second UE transmits D2D data based on a sixth RPT (sixth sub-RPT+sixth sub-RPT) 1060. In this instance, an overlap may not occur in all the four D2D communication resources. That is, the first UE and the second UE may transmit D2D data through all the four assigned D2D communication resources.

Figure 11:
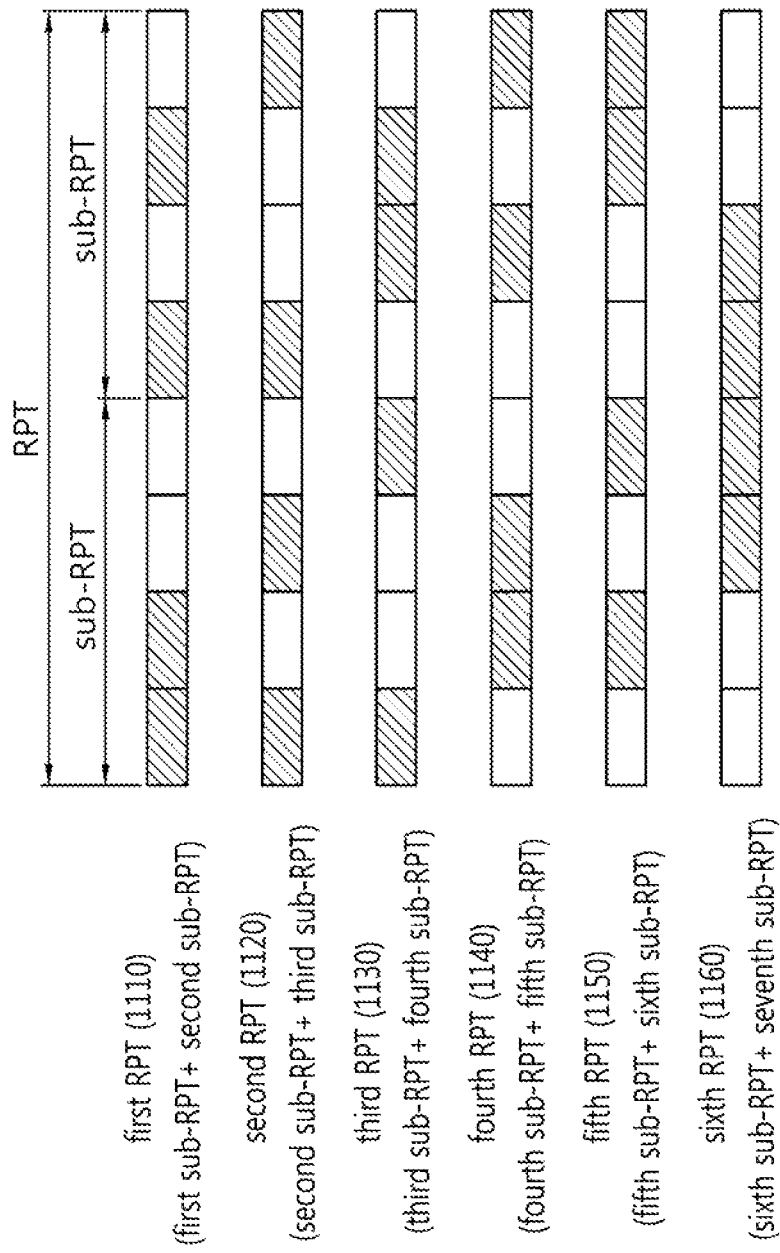
FIG. 11 is a conceptual diagram illustrating a data transmission method based on a sub-RPT, according to one or more exemplary embodiments.

FIG. 11 is a conceptual diagram illustrating a data transmission method based on a sub-RPT, according to one or more exemplary embodiments.

In FIG. 11, a data transmission method based on a sub-RPT will be described, from the perspective of a plurality of sub-RPTs forming a single RPT.

An RPT may include a plurality of sub-RPTs having different patterns. For example, the RPT may include a first sub-RPT and a second sub-RPT, or may include the second sub-RPT and a third sub-RPT.

The RPT may be defined in four D2D communication resources out of eight D2D communication candidate resources. When the RPT is defined as described in FIG. 10, a collision may occur in at least one to at most two D2D communication resources from the perspective of the RPT. That is, the UE may transmit D2D data through at least two to at most three D2D communication resources.

Particularly, for example, a first UE transmits D2D data through D2D communication resources based on a first RPT (first sub-RPT+second sub-RPT) 1110, and a second UE transmits data through D2D communication resources based on a second RPT (second sub-RPT+third sub-RPT) 1120, a third RPT (third sub-RPT+fourth sub-RPT) 1130, or a fifth RPT (fifth sub-RPT+sixth sub-RPT) 1150. In this instance, overlaps may occur in two D2D communication resources out of four D2D communication resources, and an overlap may not occur in the remaining two D2D communication resources. That is, the first UE and the second UE may transmit D2D data through two D2D communication resources.

Particularly, for example, it is assumed that the first UE transmits D2D data based on the first RPT (first sub-RPT+first sub-RPT) 1110, and the second UE transmits D2D data based on a fourth RPT (fourth sub-RPT+fifth sub-RPT) 1140 or a sixth RPT (sixth sub-RPT+first sub-RPT) 1160. In this instance, an overlap may occur in one D2D communication resource out of four D2D communication resources, and an overlap may not occur in the remaining three D2D communication resources. That is, the first UE and the second UE may transmit D2D data through three D2D communication resources.

In the case of FIG. 11, the total number of D2D communication resources that may be transmitted is decreased, when compared with the case of FIG. 10. However, the total number of RPTs that may secure D2D communication resources that may be transmitted, is increased.

When the method disclosed in FIG. 9 to FIG. 11 is used, the minimum number of transmissions of each TB is secured and the condition of D2D communication is taken into consideration, and thus, the number of available RPTs may not be limited when compared with the RPT-based transmission method of FIG. 6. When the method disclosed in FIG. 9 to FIG. 11 is used, many unnecessary RPTs are not defined when compared with the RPT-based transmission method of FIG. 7, and thus, a signaling overhead from indicating an RPT may be decreased.

Also, according to the conventional method, at most (N/2-1) collisions may occur in an RPT. However, D2D communication resources of an RPT according to the present invention and D2D communication resources of another RPT may overlap in at most N/4 D2D communication resources. From the perspective of transmission, a UE may transmit D2D data through at least N/4 to at most N/2 D2D communication resources, without a collision.

As described above, a D2D communication resource based on a sub-RPT may be a plurality of D2D communication resources based on a sub-RPT. An identical TB may be iteratively transmitted through each of the plurality of D2D communication resources based on a sub-RPT. That is, each of the plurality of D2D communication resources based on the sub-RPT may iteratively transmit an identical TB. That is, only a single TB including identical data (for example, D2D data) may be transmitted through D2D communication resources based on a single sub-RPT. A plurality of TBs including different data may not be transmitted through D2D communication resources based on a single sub-RPT. As a matter of course, a plurality of TBs may be transmitted through D2D communication resources based on an RPT which is a set of a plurality of sub-RPTs.

As described above, the TB may be used as a transmission unit of D2D data. For control data, a separate transmission unit called SA transmission unit, is transmitted through a single sub-RPT-based D2D communication resource. Hereinafter, a transmission unit of D2D data transmitted through a single sub-RPT-based D2D communication resource is referred to as a D2D data TB, and a transmission unit of a control data transmitted through a single sub-RPT—based D2D communication resource is referred to as an SA transmission unit. The sub-RPT based data transmission will be described with reference to FIGS. 12 and 13, provided below.

Figure 12:
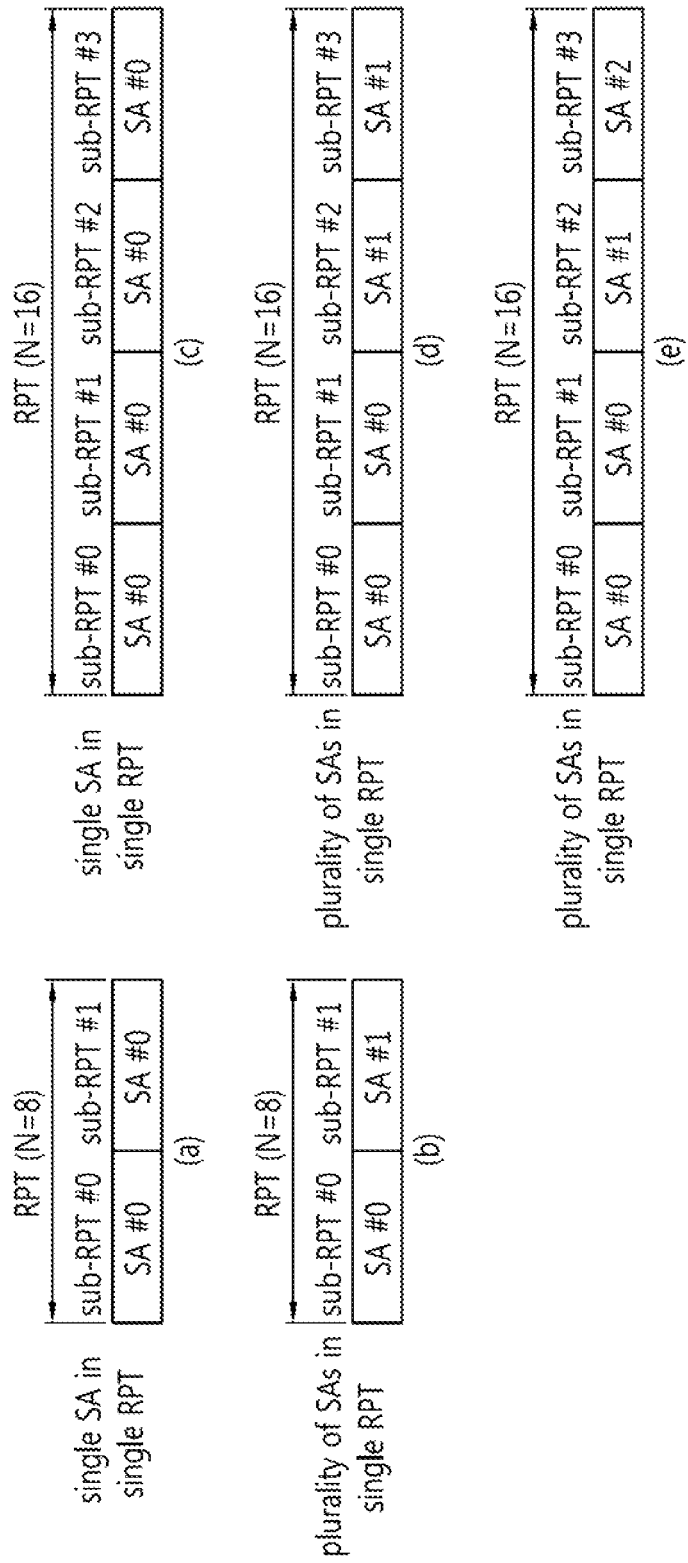
FIG. 12 is a conceptual diagram illustrating a data transmission method based on a sub-RPT, according to one or more exemplary embodiments.
Figure 13:
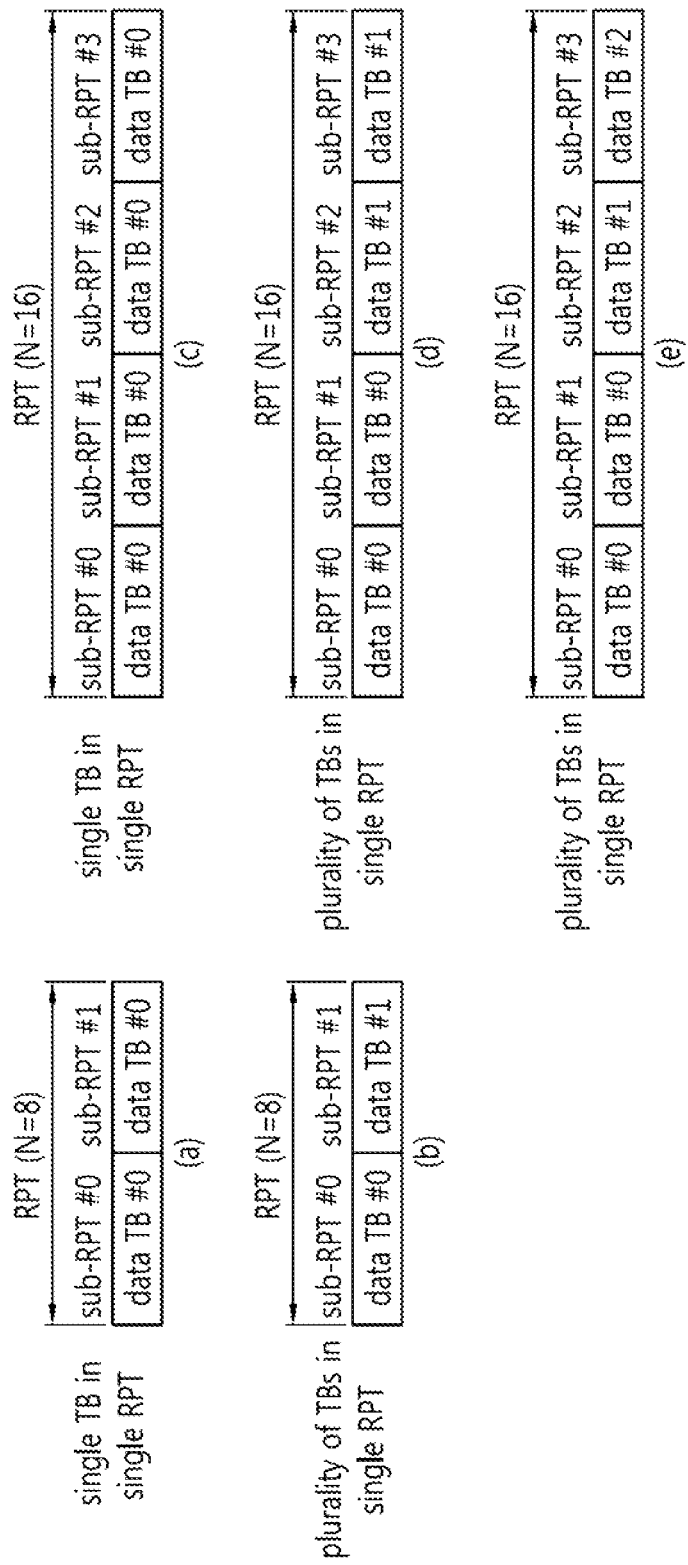
FIG. 13 is a conceptual diagram illustrating a data transmission method based on a sub-RPT, according to one or more exemplary embodiments.

FIG. 12 is a conceptual diagram illustrating a data transmission method based on a sub-RPT, according to one or more exemplary embodiments.

FIG. 12 describes the case in which an SA transmission unit is transmitted through an RPT-based D2D communication resource.

The diagram (a) of FIG. 12 illustrates the case in which a single SA transmission unit is transmitted through a single RPT-based D2D communication resource, wherein the RPT includes two sub-RPTs (first sub-RPT and second sub-RPT). An RPT may indicate a plurality of D2D communication resources out of eight D2D communication candidate resources, and a sub-RPT may indicate a plurality of D2D communication resources out of four D2D communication candidate resources. Particularly, this may be the case where D2D communication resources based on a first sub-RPT transmits a first SA transmission unit (SA #0), and D2D communication resources based on a second sub-RPT transmits the first SA transmission unit (SA #0).

The diagram (b) of FIG. 12 illustrates the case in which two SA transmission units are transmitted through a single RPT-based D2D communication resource, wherein the RPT includes two sub-RPTs (first sub-RPT and second sub-RPT). An RPT may indicate a plurality of D2D communication resources out of eight D2D communication candidate resources, and a sub-RPT may indicate a plurality of D2D communication resources out of four D2D communication candidate resources. Particularly, this may be the case where D2D communication resources based on a first sub-RPT transmits a first SA transmission unit (SA #0), and D2D communication resources based on a second sub-RPT transmits a second SA transmission unit (SA #1).

The diagram (c) of FIG. 12 illustrates the case in which a single SA transmission unit is transmitted through a single RPT-based D2D communication resource, wherein the RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of four D2D communication candidate resources. Particularly, this may be the case where D2D communication resources based on a first sub-RPT transmits a first SA transmission unit (SA #0), D2D communication resources based on a second sub-RPT transmits the first SA transmission unit (SA #0), D2D communication resources based on a third sub-RPT transmits the first SA transmission unit (SA #0), and D2D communication resources based on a fourth sub-RPT transmits the first SA transmission unit (SA #0).

The diagram (d) of FIG. 12 illustrates the case in which two SA transmission units are transmitted through a single RPT-based D2D communication resource, wherein the RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of four D2D communication candidate resources. Particularly, this may be the case where D2D communication resources based on a first sub-RPT transmits a first SA transmission unit (SA #0), D2D communication resources based on a second sub-RPT transmits the first SA transmission unit (SA #0), D2D communication resources based on a third sub-RPT transmits a second SA transmission unit (SA #1), and D2D communication resources based on a fourth sub-RPT transmits the second SA transmission unit (SA #1).

The diagram (e) of FIG. 12 illustrates the case in which three SA transmission units are transmitted through a single RPT-based D2D communication resource, wherein the RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of four D2D communication candidate resources. Particularly, this may be the case where D2D communication resources based on a first sub-RPT transmits a first SA transmission unit (SA #0), D2D communication resources based on a second sub-RPT transmits the first SA transmission unit (SA #0), D2D communication resources based on a third sub-RPT transmits a second SA transmission unit (SA #1), and D2D communication resources based on a fourth sub-RPT transmits a third SA transmission unit (SA #2).

In FIG. 12, the number of communication candidate resources defining the RPT, the number of communication candidate resources defining the sub-RPT, and the number of sub-RPTs included in an RPT are merely examples, and they may be defined by various values.

FIG. 13 is a conceptual diagram illustrating a data transmission method based on a sub-RPT, according to one or more exemplary embodiments.

FIG. 13 describes the case in which a D2D data TB is transmitted through an RPT-based D2D communication resource.

The diagram (a) of FIG. 13 illustrates the case in which a single D2D data TB is transmitted through a single RPT-based D2D communication resource, wherein an RPT includes two sub-RPTs (first sub-RPT and second sub-RPT). An RPT may indicate a plurality of D2D communication resources out of 8 D2D communication candidate resources, and a sub-RPT may indicate a plurality of D2D communication resources out of 4 D2D communication candidate resources. Particularly, this may be the case where D2D communication resources based on a first sub-RPT transmits a first D2D data TB (data TB #0), and D2D communication resources based on a second sub-RPT transmits the first D2D data TB (data TB #0).

The diagram (b) of FIG. 13 illustrates the case in which two D2D data TBs are transmitted through a single RPT-based D2D communication resource, wherein an RPT includes two sub-RPTs (first sub-RPT and second sub-RPT). An RPT may indicate a plurality of D2D communication resources out of 8 D2D communication candidate resources, and a sub-RPT may indicate a plurality of D2D communication resources out of 4 D2D communication candidate resources. Particularly, this may be the case where D2D communication resources based on a first sub-RPT transmits a first D2D data TB (data TB #0), and D2D communication resources based on a second sub-RPT transmits a second D2D data TB (data TB #1).

The diagram (c) of FIG. 13 illustrates the case in which a single D2D data TB is transmitted through a single RPT-based D2D communication resource, wherein an RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of 4 D2D communication candidate resources. Particularly, this may be the case where D2D communication resources based on a first sub-RPT transmits a first D2D data TB (data TB #0), D2D communication resources based on a second sub-RPT transmits the first D2D data TB (data TB #0), D2D communication resources based on a third sub-RPT transmits the first D2D data TB (data TB #0), and D2D communication resources based on a fourth sub-RPT transmits the first D2D data TB (data TB #0).

The diagram (d) of FIG. 13 illustrates the case in which two D2D data TBs are transmitted through a single RPT-based D2D communication resource, wherein an RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of 4 D2D communication candidate resources. Particularly, this may be the case where D2D communication resources based on a first sub-RPT transmits a first D2D data TB (data TB #0), D2D communication resources based on a second sub-RPT transmits the first D2D data TB (data TB #0), D2D communication resources based on a third sub-RPT transmits a second D2D data TB (data TB #1), and D2D communication resources based on a fourth sub-RPT transmits the second D2D data TB (data TB #1).

The diagram (e) of FIG. 13 illustrates the case in which three D2D data TBs are transmitted through a single RPT-based D2D communication resource, wherein an RPT includes four sub-RPTs (first sub-RPT to fourth sub-RPT). An RPT may indicate a plurality of D2D communication resources out of 16 D2D communication candidate resources, and a sub-RPT may indicate a plurality of D2D communication resources out of 4 D2D communication candidate resources. Particularly, this may be the case where D2D communication resources based on a first sub-RPT transmits a first D2D data TB (data TB #0), D2D communication resources based on a second sub-RPT transmits the first D2D data TB (data TB #0), D2D communication resources based on a third sub-RPT transmits a second D2D data TB (data TB #1), and D2D communication resources based on a fourth sub-RPT transmits a third D2D data TB (data TB #2).

In FIG. 13, the number of communication candidate resources defining the RPT, the number of communication candidate resources defining the sub RPT, and the number of sub-RPTs included in an RPT are merely examples, and they may be defined by various values.

Hereinafter, an RPT configured based on various sub-RPTs will be described through an embodiment of the present invention. Sub-RPTs included in the RPT according to an embodiment of the present invention may be expressed as shown in Table 1 to Table 9.

TABLE 1

| RPT index | Sub-RPT index of sub-RPT included in RPT |
| --- | --- |
| first RPT (RPT #0) | first sub-RPT (pattern #0) |
| second RPT (RPT #1) | second sub-RPT (pattern #1) |
| third RPT (RPT #2) | third sub-RPT (pattern #2) |
| fourth RPT (RPT #3) | fourth sub-RPT (pattern #3) |
| fifth RPT (RPT #4) | fifth sub-RPT (pattern #4) |
| sixth RPT (RPT #5) | sixth sub-RPT (pattern #5) |

Table 1 is associated with a sub-RPT disclosed in FIG. 9, and shows that a single RPT includes a single sub-RPT. That is, an RPT and a sub-RPT are identical.

includes a single sub-RPT. That is, an RPT and a sub-RPT are identical.

Table 1 corresponds to the case of L=4, K=1, N=4, and M=N/2=2. L denotes the number of D2D communication candidate resources where a sub-RPT is defined, K denotes the number of sub-RPTs included in a single RPT, N denotes the number of D2D communication candidate resources where an RPT is defined, and M denotes the number of D2D communication resources out of the D2D communication candidate resources where an RPT is defined.

As illustrated in FIG. 9, a first sub-RPT may indicate two D2D communication resources out of four D2D communication candidate resources. A UE may transmit D2D data through two D2D communication resources based on the first sub-RPT, and may receive D2D data through two D2D communication candidate resources, remaining after excluding the two D2D communication resources from four D2D communication candidate resources.

Between D2D communication resources based on a first sub-RPT and D2D communication resources based on remaining sub-RPTs (second sub-RPT to sixth sub RPT), a collision occurs once (at a second sub-RPT), once (at a third sub-RPT), once (at a fourth sub-RPT), once (at a fifth sub-RPT), and zero times (at a sixth sub-RPT). In other words, a UE that transmits D2D data based on the D2D communication resources based on the first sub-RPT may transmit or receive D2D data once (at the second sub-RPT), once (at the third sub-RPT), once (at the fourth sub-RPT), once (at the fifth sub-RPT), and two times (at the sixth sub-RPT), without a collision with a UE that transmits D2D data based on the D2D communication resources based on the second sub-RPT to a UE that transmits D2D data based on the D2D communication resources based a sixth sub-RPT.

TABLE 2

| | Sub-RPT index of sub-RPT included in RPT | |
| --- | --- | --- |
| RPT index | Sub-RPT in first place | Sub-RPT in second place |
| first RPT (RPT #0) | first sub-RPT (pattern #0) | first sub-RPT (pattern #0) |
| second RPT (RPT #1) | second sub-RPT (pattern #1) | second sub-RPT (pattern #1) |
| third RPT (RPT #2) | third sub-RPT (pattern #2) | third sub-RPT (pattern #2) |
| fourth RPT (RPT #3) | fourth sub-RPT (pattern #3) | fourth sub-RPT (pattern #3) |
| fifth RPT (RPT #4) | fifth sub-RPT (pattern #4) | fifth sub-RPT (pattern #4) |
| sixth RPT (RPT #5) | sixth sub-RPT (pattern #5) | sixth sub-RPT (pattern #5) |

Table 2 is associated with a sub-RPT disclosed in FIG. 9, and shows that a single RPT includes two sub-RPTs. Also, Table 2 corresponds to the case of L = 4, K = 2, N = 8, and M = N/2 = 4.

includes two sub-RPTs. Also, Table 2 corresponds to the case of L=4, K=2, N=8, and M=N/2=4.

As illustrated in FIG. 10, an RPT may indicate four D2D communication resources out of eight D2D communication candidate resources. Each of a sub-RPT in a first place and a sub-RPT in a second place indicates two D2D communication resources out of 4 D2D communication candidate resources.

From the perspective of an RPT, a UE may transmit D2D data through four D2D communication resources based on an RPT, and may receive, from another UE, D2D data through four D2D communication candidate resources, remaining after excluding the four D2D communication resources from eight D2D communication candidate resources.

Between D2D communication resources based on a first RPT and D2D communication resources based on remaining RPTs (second RPT to sixth RPT), a collision occurs two times (at the second RPT), two times (at a third RPT), two times (at a fourth RPT), two times (at a fifth RPT), and zero times (at the sixth RPT). In other words, a UE that transmits D2D data based on the D2D communication resources based on the first RPT may transmit or receive D2D data two times (at the second RPT), two times (at the third RPT), two times (at the fourth RPT), two times (at the fifth RPT), and four times (at the sixth RPT), without a collision with a UE that transmits D2D data based on the D2D communication resources based on the second RPT to a UE that transmits D2D data based on D2D communication resources based the sixth RPT.

TABLE 3

| RPT index | Sub-RPT in first place | Sub-RPT in second place |
|---|---|---|
| first RPT (RPT #0) | first sub-RPT (pattern #0) | second sub-RPT (pattern #1) |
| second RPT (RPT #1) | second sub-RPT (pattern #1) | third sub-RPT (pattern #2) |
| third RPT (RPT #2) | third sub-RPT (pattern #2) | fourth sub-RPT (pattern #3) |
| fourth RPT (RPT #3) | fourth sub-RPT (pattern #3) | fifth sub-RPT (pattern #4) |
| fifth RPT (RPT #4) | fifth sub-RPT (pattern #4) | sixth sub-RPT (pattern #5) |
| sixth RPT (RPT #5) | sixth sub-RPT (pattern #5) | first sub-RPT (pattern #0) |

Table 3 is associated with an RPT and a sub-RPT disclosed in FIG. 10, and shows that a single RPT includes two sub-RPTs. Also, Table 2 corresponds to the case of L = 4, K = 2, N = 8, and M = N/2 = 4.

a single RPT includes two sub-RPTs. Also, Table 2 corresponds to the case of L=4, K=2, N=8, and M=N/2=4.

As illustrated in FIG. 11, an RPT may indicate four D2D communication resources out of eight D2D communication candidate resources. Each of a sub-RPT in a first place and a sub-RPT in a second place indicates two D2D communication resources out of 4 D2D communication candidate resources.

From the perspective of an RPT, a UE may transmit D2D data through four D2D communication resources based on an RPT, and may receive D2D data through four D2D communication candidate resources, remaining after excluding the four D2D communication resources from eight D2D communication candidate resources.

Between D2D communication resources based on the first RPT and D2D communication resources based on remaining RPTs (second RPT to sixth RPT), a collision occurs two times (at the second RPT), two times (at a third RPT), once (at a fourth RPT), two times (at a fifth RPT), and once (at the sixth RPT). In other words, a UE that transmits D2D data based on the D2D communication resources based on the first RPT may transmit or receive D2D data two times (at the second RPT), two times (at the third RPT), three times (at the fourth RPT), two times (at the fifth RPT), and three times (at the sixth RPT), without a collision with a UE that transmits D2D data based on the D2D communication resources based on the second RPT to a UE that transmits D2D data based on D2D communication resources based the sixth RPT.

Table 4 and Table 5, provided below, disclose sub-RPTs corresponding three sub-RPTs (a sub-RPT in a first place to a sub-RPT in a third place) included in an RPT. Table 4 and Table 5 correspond to the case of L=4, K=3, N=12, and M=N/2=6.

TABLE 4

| RPT index | Sub-RPT in first place | Sub-RPT in second place | Sub-RPT in third place |
|---|---|---|---|
| first RPT (RPT #0) | first sub-RPT (pattern #0) | first sub-RPT (pattern #0) | first sub-RPT (pattern #0) |
| second RPT (RPT #1) | second sub-RPT (pattern #1) | second sub-RPT (pattern #1) | second sub-RPT (pattern #1) |
| third RPT (RPT #2) | third sub-RPT (pattern #2) | third sub-RPT (pattern #2) | third sub-RPT (pattern #2) |
| fourth RPT (RPT #3) | fourth sub-RPT (pattern #3) | fourth sub-RPT (pattern #3) | fourth sub-RPT (pattern #3) |
| fifth RPT (RPT #4) | fifth sub-RPT (pattern #4) | fifth sub-RPT (pattern #4) | fifth sub-RPT (pattern #4) |
| sixth RPT (RPT #5) | sixth sub-RPT (pattern #5) | sixth sub-RPT (pattern #5) | sixth sub-RPT (pattern #5) |

TABLE 5

| RPT index | Sub-RPT in first place | Sub-RPT in second place | Sub-RPT in third place |
|---|---|---|---|
| first RPT (RPT #0) | first sub-RPT (pattern #0) | second sub-RPT (pattern #1) | third sub-RPT (pattern #2) |
| second RPT (RPT #1) | second sub-RPT (pattern #1) | third sub-RPT (pattern #2) | fourth sub-RPT (pattern #3) |
| third RPT (RPT #2) | third sub-RPT (pattern #2) | fourth sub-RPT (pattern #3) | fifth sub-RPT (pattern #4) |
| fourth RPT (RPT #3) | fourth sub-RPT (pattern #3) | fifth sub-RPT (pattern #4) | sixth sub-RPT (pattern #5) |
| fifth RPT (RPT #4) | fifth sub-RPT (pattern #4) | sixth sub-RPT (pattern #5) | first sub-RPT (pattern #0) |
| sixth RPT (RPT #5) | sixth sub-RPT (pattern #5) | first sub-RPT (pattern #0) | second sub-RPT (pattern #1) |

Table 6 and Table 7, provided below, disclose sub-RPTs corresponding four sub-RPTs (a sub-RPT in a first place to a sub-RPT in a fourth place) included in a RPT. Table 6 and Table 7 correspond to the case of L = 4, K = 4, N = 16, and M = N/2 = 8.

(a sub-RPT in a first place to a sub-RPT in a fourth place) included in an RPT. Table 6 and Table 7 correspond to the case of L=4, K=4, N=16, and M=N/2=8.

TABLE 6

| | Sub-RPT index of sub-RPT included in RPT | | | |
|---|---|---|---|---|
| RPT index | Sub-RPT in first place | Sub-RPT in second place | Sub-RPT in third place | Sub-RPT in fourth place |
| first RPT (RPT #0) | first sub-RPT (pattern #0) | first sub-RPT (pattern #0) | first sub-RPT (pattern #0) | first sub-RPT (pattern #0) |
| second RPT (RPT #1) | second sub-RPT (pattern #1) | second sub-RPT (pattern #1) | second sub-RPT (pattern #1) | second sub-RPT (pattern #1) |
| third RPT (RPT #2) | third sub-RPT (pattern #2) | third sub-RPT (pattern #2) | third sub-RPT (pattern #2) | third sub-RPT (pattern #2) |
| fourth RPT (RPT #3) | fourth sub-RPT (pattern #3) | fourth sub-RPT (pattern #3) | fourth sub-RPT (pattern #3) | fourth sub-RPT (pattern #3) |
| fifth RPT (RPT #4) | fifth sub-RPT (pattern #4) | fifth sub-RPT (pattern #4) | fifth sub-RPT (pattern #4) | fifth sub-RPT (pattern #4) |
| sixth RPT (RPT #5) | sixth sub-RPT (pattern #5) | sixth sub-RPT (pattern #5) | sixth sub-RPT (pattern #5) | sixth sub-RPT (pattern #5) |

TABLE 7

| | Sub-RPT index of sub-RPT included in RPT | | | |
|---|---|---|---|---|
| RPT index | Sub-RPT in first place | Sub-RPT in second place | Sub-RPT in third place | Sub-RPT in fourth place |
| first RPT (RPT #0) | first sub-RPT (pattern #0) | second sub-RPT (pattern #1) | third sub-RPT (pattern #2) | fourth sub-RPT (pattern #3) |
| second RPT (RPT #1) | second sub-RPT (pattern #1) | third sub-RPT (pattern #2) | fourth sub-RPT (pattern #3) | fifth sub-RPT (pattern #4) |
| third RPT (RPT #2) | third sub-RPT (pattern #2) | fourth sub-RPT (pattern #3) | fifth sub-RPT (pattern #4) | sixth sub-RPT (pattern #5) |
| fourth RPT (RPT #3) | fourth sub-RPT (pattern #3) | fifth sub-RPT (pattern #4) | sixth sub-RPT (pattern #5) | first sub-RPT (pattern #0) |
| fifth RPT (RPT #4) | fifth sub-RPT (pattern #4) | sixth sub-RPT (pattern #5) | first sub-RPT (pattern #0) | second sub-RPT (pattern #1) |
| sixth RPT (RPT #5) | sixth sub-RPT (pattern #5) | first sub-RPT (pattern #0) | second sub-RPT (pattern #1) | third sub-RPT (pattern #2) |

Table 8 and Table 9, provided below, disclose sub-RPTs corresponding eight sub-RPTs (a sub-RPT in a first place to a sub-RPT in an eighth place) included in an RPT. Table 8 and Table 9 correspond to the case of L=4, K=8, N=32, and M=N/2=16.

TABLE 8

| | Sub-RPT index of sub-RPT included in RPT | | | | | | | |
|---|---|---|---|---|---|---|---|---|
| RPT index | Sub-RPT in first place | Sub-RPT in second place | Sub-RPT in third place | Sub-RPT in fourth place | Sub-RPT in fifth place | Sub-RPT in sixth place | Sub-RPT in seventh place | Sub-RPT in eighth place |
| first RPT (RPT #0) | first sub-RPT (pattern #0) | first sub-RPT (pattern #0) | first sub-RPT (pattern #0) | first sub-RPT (pattern #0) | first sub-RPT (pattern #0) | first sub-RPT (pattern #0) | first sub-RPT (pattern #0) | first sub-RPT (pattern #0) |
| second RPT (RPT #1) | second sub-RPT (pattern #1) | second sub-RPT (pattern #1) | second sub-RPT (pattern #1) | second sub-RPT (pattern #1) | second sub-RPT (pattern #1) | second sub-RPT (pattern #1) | second sub-RPT (pattern #1) | second sub-RPT (pattern #1) |
| third RPT (RPT #2) | third sub-RPT (pattern #2) | third sub-RPT (pattern #2) | third sub-RPT (pattern #2) | third sub-RPT (pattern #2) | third sub-RPT (pattern #2) | third sub-RPT (pattern #2) | third sub-RPT (pattern #2) | third sub-RPT (pattern #2) |
| fourth RPT (RPT #3) | fourth sub-RPT (pattern #3) | fourth sub-RPT (pattern #3) | fourth sub-RPT (pattern #3) | fourth sub-RPT (pattern #3) | fourth sub-RPT (pattern #3) | fourth sub-RPT (pattern #3) | fourth sub-RPT (pattern #3) | fourth sub-RPT (pattern #3) |
| fifth RPT (RPT #4) | fifth sub-RPT (pattern #4) | fifth sub-RPT (pattern #4) | fifth sub-RPT (pattern #4) | fifth sub-RPT (pattern #4) | fifth sub-RPT (pattern #4) | fifth sub-RPT (pattern #4) | fifth sub-RPT (pattern #4) | fifth sub-RPT (pattern #4) |
| sixth RPT (RPT #5) | sixth sub-RPT (pattern #5) | sixth sub-RPT (pattern #5) | sixth sub-RPT (pattern #5) | sixth sub-RPT (pattern #5) | sixth sub-RPT (pattern #5) | sixth sub-RPT (pattern #5) | sixth sub-RPT (pattern #5) | sixth sub-RPT (pattern #5) |

TABLE 9

Sub-RPT index of sub-RPT included in RPT

| RPT index | Sub-RPT in first place | Sub-RPT in second place | Sub-RPT in third place | Sub-RPT in fourth place | Sub-RPT in fifth place | Sub-RPT in sixth place | Sub-RPT in seventh place | Sub-RPT in eighth place |
|---|---|---|---|---|---|---|---|---|
| first RPT (RPT #0) | first sub-RPT (pattern #0) | second sub-RPT (pattern #1) | third sub-RPT (pattern #2) | fourth sub-RPT (pattern #3) | fifth sub-RPT (pattern #4) | sixth sub-RPT (pattern #5) | first sub-RPT (pattern #0) | second sub-RPT (pattern #1) |
| second RPT (RPT #1) | second sub-RPT (pattern #1) | third sub-RPT (pattern #2) | fourth sub-RPT (pattern #3) | fifth sub-RPT (pattern #4) | sixth sub-RPT (pattern #5) | first sub-RPT (pattern #0) | second sub-RPT (pattern #1) | third sub-RPT (pattern #2) |
| third RPT (RPT #2) | third sub-RPT (pattern #2) | fourth sub-RPT (pattern #3) | fifth sub-RPT (pattern #4) | sixth sub-RPT (pattern #5) | first sub-RPT (pattern #0) | second sub-RPT (pattern #1) | third sub-RPT (pattern #2) | fourth sub-RPT (pattern #3) |
| fourth RPT (RPT #3) | fourth sub-RPT (pattern #3) | fifth sub-RPT (pattern #4) | sixth sub-RPT (pattern #5) | first sub-RPT (pattern #0) | second sub-RPT (pattern #1) | third sub-RPT (pattern #2) | fourth sub-RPT (pattern #3) | fifth sub-RPT (pattern #4) |
| fifth RPT (RPT #4) | fifth sub-RPT (pattern #4) | sixth sub-RPT (pattern #5) | first sub-RPT (pattern #0) | second sub-RPT (pattern #1) | third sub-RPT (pattern #2) | fourth sub-RPT (pattern #3) | fifth sub-RPT (pattern #4) | sixth sub-RPT (pattern #5) |
| sixth RPT (RPT #5) | sixth sub-RPT (pattern #5) | first sub-RPT (pattern #0) | second sub-RPT (pattern #1) | third sub-RPT (pattern #2) | fourth sub-RPT (pattern #3) | fifth sub-RPT (pattern #4) | sixth sub-RPT (pattern #5) | first sub-RPT (pattern #0) |

Figure 14:
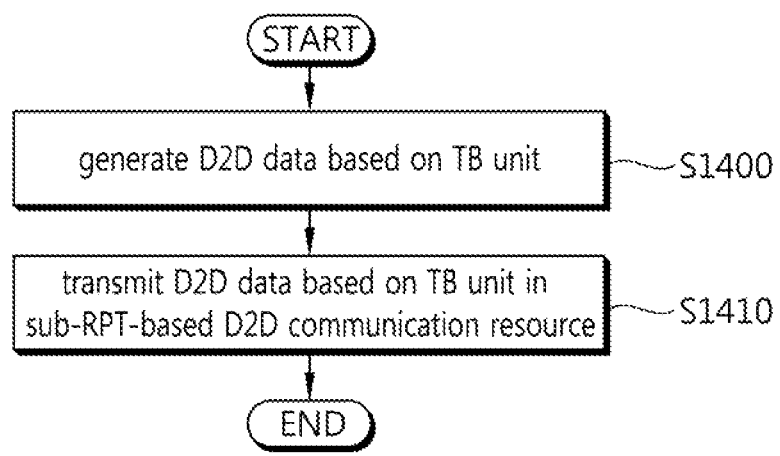
FIG. 14 is a flowchart illustrating an example of a method of transmitting a D2D, according to one or more exemplary embodiments.

FIG. 14 is a flowchart illustrating a method of transmitting D2D communication data, according to one or more exemplary embodiments.

In FIG. 14, a method in which a first UE transmits D2D data is disclosed.

The first UE generates D2D data based on a TB unit, in operation S1400.

The first UE may generate D2D data based on a TB unit, which may be transmitted on at least one D2D communication resource based on a sub-RPT.

The first UE transmits only first D2D data to a second UE on at least one D2D communication resource based on a sub-RPT, in operation S1410.

As described above, a sub-RPT may configure an RPT defined in a D2D resource pool. A sub-RPT may indicate at least one D2D communication resource for transmitting only the first D2D data from among a plurality of D2D communication candidate resources. Each of the plurality of D2D communication candidate resources corresponds to one or two subframes, and when the number of the plurality of D2D communication candidate resources is L (here, L is an integer), the number of at least one D2D communication resources may be $\lfloor L/2 \rfloor$ or $\lceil L/2 \rceil$.

Particularly, the number of the plurality of D2D communication candidate resources may be 4 and the number of at least one D2D communication resources may be 2. In this instance, as described in FIG. 9, a sub-RPT may be one of a first sub-RPT, a second sub-RPT, a third sub-RPT, a fourth sub-RPT, a fifth sub-RPT, and a sixth sub-RPT. The first sub-RPT, the second sub-RPT, the third sub-RPT, the fourth sub-RPT, the fifth sub-RPT, and the sixth sub-RPT may indicate different D2D communication resources, respectively.

An RPT may be formed of a predetermined sub-RPT and a sub-RPT identical to the predetermined sub-RPT, or a predetermined sub-RPT and a sub-RPT different from the predetermined sub-RPT.

The first UE may receive second D2D data based on a TB unit from the second UE on D2D communication candidate resources remaining after excluding at least one D2D communication resources from a plurality of D2D communication candidate resources.

Figure 15:
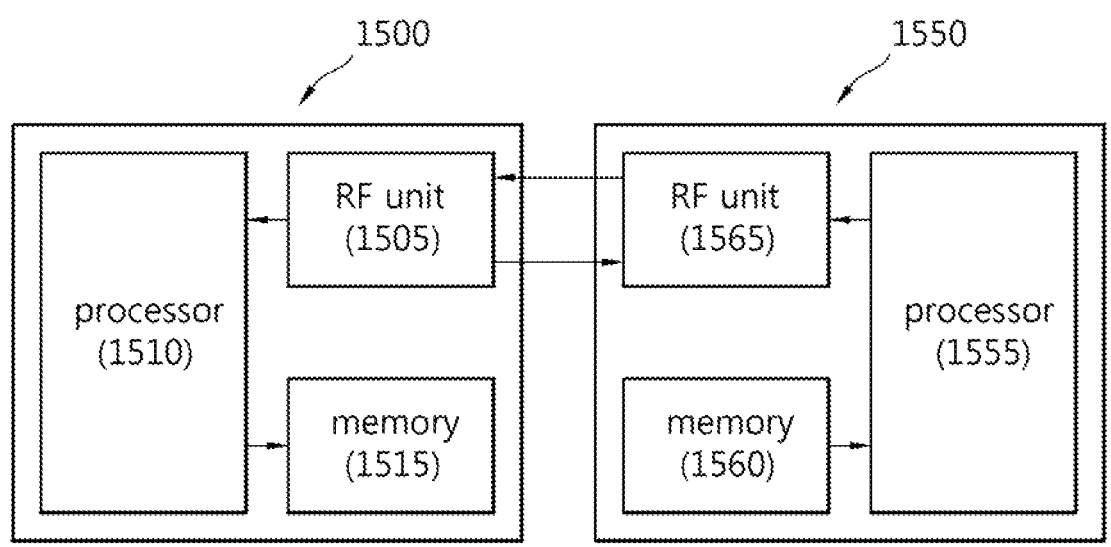
FIG. 15 is a block diagram illustrating a wireless communication system where one or more exemplary embodiments are implemented.

FIG. 15 is a block diagram illustrating a wireless communication system where one or more exemplary embodiments are implemented.

Referring to FIG. 15, a UE 1500 includes a Radio Frequency (RF) unit 1505, a processor 1510, and a memory 1515. The memory 1515 is connected with the processor 1510, and stores various pieces of information for driving the processor 1510. The RF unit 1505 is connected with the processor 1510, and transmits and/or receives a wireless signal. For example, the RF unit 1505 may transmit D2D data or control data to another UE.

The processor 1510 may implement the proposed functions, processes, and/or methods described herein. Particularly, the processor 1510 may execute all the operations associated with FIG. 8 to FIG. 14. For example, the processor 1510 may be embodied to generate first D2D data based on a TB unit, and to transmit only first D2D data to a second UE on at least one D2D communication resource based on a sub-RPT, according to one or more exemplary embodiments. Here, a sub-RPT forms an RPT defined in a D2D resource pool, and a sub-RPT may indicate at least one D2D communication resource for transmitting only first D2D data from among a plurality of D2D communication candidate resources.

The memory 1515 may operate for generating D2D data described herein.

A BS 1550 includes a processor 1555, a memory 1560, and a Radio Frequency (RF) unit 1565. The memory 1560 is connected with the processor 1555, and stores various pieces of information for driving the processor 1555. The RF unit 1565 is connected with the processor 1555, and transmits and/or receives a wireless signal. The processor 1555 may implement the proposed functions, processes, and/or methods. In the above described embodiments, the operations of a BS may be implanted by the processor 1555. The processor 1555 may transmit D2D grant information to a UE, and the UE may transmit D2D data on at least one D2D communication resource determined based on the D2D grant information.

A first UE 1500 may include the processor 1510, the RF unit 1505, and the memory 1515. The processor 1510 may process a data mapping to a time-frequency resource and the RF unit 1505 may transmit (or receive) a wireless signal for a D2D communication directly to another UE (or from another UE). The processor 1510 may generate first D2D data, the first D2D data corresponding to a transport block (TB) unit. The RF unit may transmit, to a second UE, the first D2D data through at least one D2D communication resource, the at least one D2D communication resource being based on a sub-RPT (sub-resource pattern for transmission). An RPT may be defined in a D2D resource pool is configured based on the sub-RPT, and the sub-RPT indicates the at least one D2D communication resource for the transmission of the first D2D data among at least two D2D communication candidate resources.

The RPT may indicate total D2D communication resources for transmitting D2D data among total D2D communication candidate resources, and the D2D data includes the first D2D data. The total D2D communication candidate resources correspond to a set of D2D communication candidate resources defined in the D2D resource pool and comprise the at least two D2D communication candidate resources. The total D2D communication resources correspond to a set of D2D communication resource defined in the D2D resource pool and comprise the at least one D2D communication resource.

Further, each of the at least two D2D communication candidate resources may correspond to one or two subframes, and the number of the at least one D2D communication resource is $\lfloor L/2 \rfloor$ or $\lceil L/2 \rceil$, where L is a number of the at least two D2D communication candidate resources.

For example, the number of the at least two D2D communication candidate resources may be 4, and the number of the at least one D2D communication resource may be 2. The—RPT may be one of a first sub-RPT, a second sub-RPT, a third sub-RPT, a fourth sub-RPT, a fifth sub-RPT, and a sixth sub-RPT, and D2D communication resources indicated by the first sub-RPT, the second sub-RPT, the third sub-RPT, the fourth sub-RPT, the fifth sub-RPT, and the sixth sub-RPT may be different from each other.

Further, the RPT may be configured by grouping the sub-RPT and another sub-RPT identical to the sub-RPT or grouping the sub-RPT and another sub-RPT different from the sub-RPT.

The radio frequency unit may receive a second D2D data from the second UE through a D2D communication resource different from the at least one D2D communication resource associated with the first D2D data. The D2D communication resource through which the second D2D data is received may be selected from among the at least two D2D communication candidate resources. The second D2D data corresponds to a transport block (TB) unit.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A non-transitory computer-readable medium storing instructions that, when executed, cause a first wireless user device to:
    receive, via a wireless transceiver, at least one configuration parameter associated with device-to-device communication between wireless user devices;
    determine a resource pool comprising communication resources selected from a plurality of transmission opportunities, wherein the selected communication resources comprise a sequence of transmission opportunities, in different time durations, for device-to-device communication;
    determine, based on a length of the resource pool, a resource pattern for transmission (RPT) comprising a plurality of sub-RPTs, wherein each of the sub-RPTs indicates different transmission opportunities in the sequence of transmission opportunities and has a same selection pattern for indicating at least one transmission opportunity in which the first wireless user device transmits data;
    determine, based on the RPT and from the sequence of transmission opportunities, a first plurality of transmission opportunities for data transmission, wherein the sub-RPTs each excludes at least one transmission opportunity according to a same exclusion pattern, wherein a first one of the sub-RPTs precedes a second one of the sub-RPTs in the RPT; and
    transmit, from the first wireless user device to a second wireless user device, the data via the first plurality of transmission opportunities.

2. The non-transitory computer-readable medium of claim 1, wherein the instructions, when executed, cause the first wireless user device to:
    determine a sub-RPT from among a plurality of available sub-RPTs; and
    configure the RPT by repeating the determined sub-RPT one or more times.

3. The non-transitory computer-readable medium of claim 1, wherein at least part of the first plurality of transmission opportunities is discontiguous, and
    wherein at least one transmission opportunity selected based on the first one of the sub-RPTs precedes at least one transmission opportunity selected based on the second one of the sub-RPTs in a time axis.

4. The non-transitory computer-readable medium of claim 1, wherein the data comprises first data corresponding to a first transport block (TB) and second data corresponding to a second TB.

5. The non-transitory computer-readable medium of claim 4, wherein the instructions, when executed, cause the first wireless user device to transmit the first TB via first four transmission opportunities of the first plurality of transmission opportunities.

6. The non-transitory computer-readable medium of claim 4, wherein the sub-RPTs each indicates two transmission opportunities in which the first wireless user device transmits data, and
    wherein the first TB is transmitted via four transmission opportunities indicated by two of the sub-RPTs included in the RPT.

7. The non-transitory computer-readable medium of claim 4, wherein the sub-RPTs each indicates four transmission opportunities in which the first wireless user device transmits data, and
   wherein the first TB is transmitted via four transmission opportunities indicated by one of the sub-RPTs included in the RPT.

8. The non-transitory computer-readable medium of claim 4, wherein the sub-RPTs each indicates one transmission opportunity in which the first wireless user device transmits data, and
   wherein the first TB is transmitted via four transmission opportunities indicated by four of the sub-RPTs included in the RPT.

9. The non-transitory computer-readable medium of claim 4, wherein the instructions, when executed, cause the first wireless user device to transmit the second TB via transmission opportunities indicated by one, two, or four of the sub-RPTs.

10. A non-transitory computer-readable medium storing instructions that, when executed, cause a first wireless user device to:
   determine a device-to-device resource pool comprising device-to-device communication resources selected from a plurality of transmission opportunities, wherein the selected device-to-device communication resources comprise a sequence of device-to-device transmission opportunities assigned for device-to-device communication;
   determine, based on a length of the device-to-device resource pool, a resource pattern for transmission (RPT) comprising a plurality of sub-RPTs, wherein each of the sub-RPTs indicates different device-to-device transmission opportunities in the device-to-device resource pool and has a same selection pattern for identifying at least one device-to-device transmission opportunity in which the first wireless user device transmits device-to-device data;
   determine, based on the RPT and from the sequence of device-to-device transmission opportunities, a plurality of device-to-device transmission opportunities for device-to-device data transmission, wherein the sub-RPTs each excludes at least one device-to-device transmission opportunity according to a same exclusion pattern;
   generate, by the first wireless user device, device-to-device data; and
   transmit, from the first wireless user device to a second wireless user device, the generated device-to-device data through at least one device-to-device transmission opportunity of the plurality of the device-to-device transmission opportunities,
   wherein a first one of the sub-RPTs precedes a second one of the sub-RPTs in the RPT, and
   wherein at least one device-to-device transmission opportunity selected based on the first one of the sub-RPTs precedes at least one device-to-device transmission opportunity selected based on the second one of the sub-RPTs in a time axis.

11. The non-transitory computer-readable medium of claim 10, wherein the instructions, when executed, cause the first wireless user device to:
   determine a sub-RPT from among a plurality of available sub-RPTs; and
   configure the RPT by repeating the determined sub-RPT one or more times.

12. The non-transitory computer-readable medium of claim 10, wherein at least part of the plurality of device-to-device transmission opportunities is discontiguous.

13. The non-transitory computer-readable medium of claim 10, wherein the generated device-to-device data comprises first device-to-device data corresponding to a first transport block (TB) and second device-to-device data corresponding to a second TB.

14. The non-transitory computer-readable medium of claim 13, wherein the instructions, when executed, cause the first wireless user device to transmit the first TB through first four transmission opportunities from among the device-to-device communication resources.

15. The non-transitory computer-readable medium of claim 13, wherein the sub-RPTs each identifies two transmission opportunities in which the first wireless user device transmits device-to-device data, and wherein the first TB is transmitted through four transmission opportunities identified by two of the sub-RPTs included in the RPT.

16. The non-transitory computer-readable medium of claim 13, wherein the sub-RPTs each identifies four transmission opportunities in which the first wireless user device transmits device-to-device data, and wherein the first TB is transmitted through four transmission opportunities identified by one of the sub-RPTs included in the RPT.

17. The non-transitory computer-readable medium of claim 13, wherein the sub-RPTs each identifies one transmission opportunity in which the first wireless user device transmits device-to-device data, and wherein the first TB is transmitted through four transmission opportunities identified by four of the sub-RPTs included in the RPT.

18. The non-transitory computer-readable medium of claim 13, wherein the first wireless user device transmits the second TB through transmission opportunities identified by one, two, or four of the sub-RPTs.

* * * * *